US 11,481,951 B2

(12) United States Patent
Yang et al.

(10) Patent No.: US 11,481,951 B2
(45) Date of Patent: Oct. 25, 2022

(54) GRAPHICS PROCESSING METHOD AND SYSTEM FOR RENDERING ITEMS OF GEOMETRY BASED ON THEIR SIZE

(71) Applicant: Imagination Technologies Limited, Kings Langley (GB)

(72) Inventors: Xile Yang, Rickmansworth (GB); Robert Brigg, Watford (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

(21) Appl. No.: 17/169,828

(22) Filed: Feb. 8, 2021

(65) Prior Publication Data
US 2021/0279954 A1 Sep. 9, 2021

(30) Foreign Application Priority Data

Feb. 7, 2020 (GB) .................................... 2001716

(51) Int. Cl.
*G06T 11/40* (2006.01)
*G06T 15/00* (2011.01)
(Continued)

(52) U.S. Cl.
CPC .............. *G06T 15/005* (2013.01); *G06T 1/20* (2013.01); *G06T 1/60* (2013.01); *G06T 9/00* (2013.01);
(Continued)

(58) Field of Classification Search
CPC . G06T 11/20; G06T 11/40; G06T 1/60; G06T 9/00; G06T 15/04; G06T 15/00;
(Continued)

(56) References Cited

U.S. PATENT DOCUMENTS

| 5,864,342 A | 1/1999 | Kajiya et al. |
| 7,692,659 B1 | 4/2010 | Molnar et al. |
| (Continued) | | |

FOREIGN PATENT DOCUMENTS

| EP | 3796263 A1 | 3/2021 |
| GB | 2564503 A | 1/2019 |
| WO | 2010/070302 A2 | 6/2010 |

OTHER PUBLICATIONS

Hsiao et al.; "A Hierarchical Primitive Lists Structure for Tile-Based Rendering"; Computational Science and Engineering 2009; Aug. 29, 2009; pp. 408-413.

*Primary Examiner* — Phi Hoang
(74) *Attorney, Agent, or Firm* — Potomac Law Group, PLLC; Vincent M DeLuca

(57) ABSTRACT

Methods and graphics processing systems render items of geometry using a rendering space which is subdivided into a plurality of first regions. Each of the first regions is sub-divided into a plurality of second regions. Each of a plurality of items of geometry is processed by identifying which of the first regions the item of geometry is present within, and for each identified first region determining an indication of the spatial coverage, within the identified first region, of the item of geometry, and using the determined indication of the spatial coverage within the identified first region to determine whether to add the item of geometry to a first control list for the identified first region or to add the item of geometry to one or more second control lists for a respective one or more of the second regions within the identified first region. Items of geometry within a second region can then be rendered using: (i) the first control list for the first region of which the second region is a part, and (ii) the second control list for the second region.

20 Claims, 8 Drawing Sheets

(51) Int. Cl.
  *G06T 1/20* (2006.01)
  *G06T 1/60* (2006.01)
  *G06T 9/00* (2006.01)
  *G06T 11/20* (2006.01)
  *G06T 15/04* (2011.01)
  *G06T 17/10* (2006.01)

(52) U.S. Cl.
  CPC .............. *G06T 11/20* (2013.01); *G06T 11/40* (2013.01); *G06T 15/00* (2013.01); *G06T 15/04* (2013.01); *G06T 17/10* (2013.01); *G06T 2210/12* (2013.01)

(58) Field of Classification Search
  CPC ... G06T 11/001; G06T 2210/12; G06T 17/10; G06T 1/20; G06T 15/005
  See application file for complete search history.

(56) References Cited

U.S. PATENT DOCUMENTS

| | | | |
|---|---|---|---|
| 9,058,685 B2* | 6/2015 | Keall | G06T 15/005 |
| 9,349,215 B1* | 5/2016 | Baldwin | G06T 1/20 |
| 10,217,272 B2 | 2/2019 | Akenine-Moller et al. | |
| 10,614,549 B2 | 4/2020 | Berghoff | |
| 11,030,783 B1 | 6/2021 | Engh-Halstvedt et al. | |
| 2008/0211810 A1 | 9/2008 | Falchetto | |
| 2010/0110102 A1 | 5/2010 | Nystad et al. | |
| 2011/0292032 A1 | 12/2011 | Yang | |
| 2014/0139534 A1 | 5/2014 | Tapply et al. | |
| 2015/0049107 A1* | 2/2015 | Park | G06T 15/005 345/582 |
| 2015/0109293 A1 | 4/2015 | Wang et al. | |
| 2017/0024927 A1 | 1/2017 | Isomäki et al. | |
| 2017/0084078 A1 | 3/2017 | Boudier | |
| 2017/0309027 A1 | 10/2017 | Kleen et al. | |
| 2017/0316604 A1 | 11/2017 | Yang et al. | |
| 2017/0330372 A1 | 11/2017 | Kakarlapudi et al. | |
| 2017/0352182 A1 | 12/2017 | Wang et al. | |
| 2019/0172247 A1* | 6/2019 | Grossman | G06T 15/005 |
| 2019/0188896 A1 | 6/2019 | Heggelund et al. | |
| 2020/0074721 A1 | 3/2020 | Heggelund et al. | |
| 2020/0082505 A1* | 3/2020 | Croxford | G06T 3/4053 |
| 2020/0151926 A1* | 5/2020 | Uhrenholt | G06T 1/20 |
| 2021/0097639 A1 | 4/2021 | Venkatesh et al. | |

* cited by examiner

| Macro tile control list 522 | | |
|---|---|---|
| Primitive block ID | Primitive index | Tile block mask |
| 2 | 7 | 11110011 |
| 3 | 6 | 00111110 |
| 3 | 1 | 11111111 |
| 5 | 2 | 10111101 |

526 →

| Tile control list 524 | |
|---|---|
| Primitive block ID | Primitive mask |
| 1 | 01010100 |
| 4 | 10010001 |
| 5 | 00000010 |
| 6 | 10001011 |

528 →

GRAPHICS PROCESSING METHOD AND SYSTEM FOR RENDERING ITEMS OF GEOMETRY BASED ON THEIR SIZE

FIELD

This disclosure relates to graphics processing systems and methods of rendering using graphics processing systems.

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). As is known in the art, there are many benefits to subdividing the rendering space into tiles. For example, subdividing the rendering space into tiles allows an image to be rendered in a tile-by-tile manner, wherein graphics data for a tile can be temporarily stored "on-chip" during the rendering of the tile, thereby reducing the amount of data transferred between a system memory and a chip on which a graphics processing unit (GPU) of the graphics processing system is implemented.

Tile-based graphics processing systems typically operate in two phases: a geometry processing phase and a rendering phase. In the geometry processing phase, the graphics data for a render is analysed to determine, for each of the tiles, which graphics data items are present within that tile. Then in the rendering phase (e.g. a rasterisation phase), a particular tile can be rendered by processing those graphics data items which are determined to be present within that tile (without needing to process graphics data items which were determined in the geometry processing phase to not be present within the particular tile).

FIG. 1 shows an example of a tile-based graphics processing system 100. The system 100 comprises a memory 102, geometry processing logic 104 and rendering logic 106. The geometry processing logic 104 and the rendering logic 106 may be implemented on a GPU and may share some processing resources, as is known in the art. The geometry processing logic 104 comprises a geometry fetch unit 108, geometry transform logic 110, a cull/clip unit 112, primitive block assembly logic 113 and a tiling unit 114. The rendering logic 106 comprises a parameter fetch unit 116, a hidden surface removal (HSR) unit 118 and a texturing/shading unit 120. The memory 102 may be implemented as one or more physical blocks of memory, and includes a graphics memory 122, a transformed parameter memory 124, a control lists memory 126 and a frame buffer 128.

FIG. 2 shows a flow chart for a method of operating a tile-based rendering system, such as the system shown in FIG. 1. The geometry processing logic 104 performs the geometry processing phase, in which the geometry fetch unit 108 fetches geometry data from the graphics memory 122 (in step S202) and passes the fetched data to the transform logic 110. The geometry data comprises graphics data items (i.e. items of geometry) which describe geometry to be rendered. For example, the items of geometry may represent geometric shapes, which describe surfaces of structures in the scene. Items of geometry are often "primitives". A common primitive shape is a triangle, but primitives may be other 2D shapes and may be lines or points also. Primitives can be defined by their vertices, and vertex data can be provided describing the vertices, wherein a combination of vertices describes a primitive (e.g. a triangular primitive is defined by vertex data for three vertices). Objects can be composed of one or more such primitives. In some examples, objects can be composed of many thousands, or even millions of such primitives. Scenes typically contain many objects. Items of geometry can also be meshes (formed from a plurality of primitives, such as quads which comprise two triangular primitives which share one edge). Items of geometry may also be patches, wherein a patch is described by control points, and wherein a patch is tessellated to generate a plurality of tessellated primitives.

In step S204 the geometry processing logic 104 preprocesses the items of geometry, e.g. by transforming the items of geometry into screen space, performing vertex shading, performing geometry shading and/or performing tessellation, as appropriate for the respective items of geometry. For example, the transform logic 110 may transform the items of geometry into the rendering space and may apply lighting/attribute processing as is known in the art. The resulting data is passed to the cull/clip unit 112 which culls and/or clips any geometry which falls outside of a viewing frustum. The remaining transformed items of geometry (e.g. primitives) are provided to the primitive block assembly logic 113 which groups the items of geometry into blocks (which may be referred to as "primitive blocks") for storage. For example, each block may comprise up to N primitives, and up to M vertices, where the values of N and M are an implementation design choice. Each block can be associated with a block ID such that the blocks can be identified and referenced easily. Primitives often share vertices with other primitives, so storing the vertices for primitives in blocks allows the vertex data to be stored once in the block, wherein multiple primitives in the primitive block can reference the same vertex data in the block. In step S206 the primitive blocks with the transformed geometric data items are provided to the memory 102 for storage in the transformed parameter memory 124. The transformed items of geometry and information regarding how they are packed into the primitive blocks are also provided to the tiling unit 114. In step S208, the tiling unit 114 generates control stream data for each of the tiles of the rendering space, wherein the control stream data for a tile includes a control list of identifiers of transformed primitives which are to be used for rendering the tile, i.e. a list of identifiers of transformed primitives which are positioned at least partially within the tile. The control stream data for a tile may be referred to as a "display list", "control list" or an "object list" for the tile. In step S210, the control stream data for the tiles is provided to the memory 102 for storage in the control lists memory 126. Therefore, following the geometry processing phase (i.e. after step S210), the transformed primitives to be rendered are stored in the transformed parameter memory 124 and the control stream data indicating which of the transformed primitives are present in each of the tiles is stored in the control lists memory 126.

In the rendering phase, the rendering logic 106 renders the items of geometry (primitives) in a tile-by-tile manner. In step S212, the parameter fetch unit 116 receives the control stream data (i.e. the control list) for a tile, and in step S214 the parameter fetch unit 116 fetches the indicated transformed primitives from the transformed parameter memory 124, as indicated by the control stream data for the tile. In step S216 the rendering logic 106 renders the fetched primitives by performing sampling on the primitives to determine primitive fragments which represent the primitives at discrete sample points within the tile, and then performing hidden surface removal and texturing/shading on the primitive fragments. In particular, the fetched transformed primitives are provided to the hidden surface removal (HSR) unit 118 which performs the sampling to determine the primitive fragments, and removes primitive fragments which are hidden (e.g. hidden by other primitive fragments). Methods of performing sampling and hidden surface removal are known in the art. The term "fragment" refers to a sample of a primitive at a sampling point, which is to be processed to render pixels of an image. The term "sampling" is used herein to describe the process of determining fragments which represent items of geometry (e.g. primitives) at discrete sample points, but this process can sometimes be referred to as "rasterization" or "scan conversion". In some examples, there may be a one to one mapping of fragments to pixels. However, in other examples there may be more fragments than pixels, and this oversampling can allow for higher quality rendering of pixel values, e.g. by facilitating anti-aliasing and other filtering that may be applied to multiple fragments for rendering each of the pixel values. Primitives which are not removed by the HSR unit 118 are provided to the texturing/shading unit 120, which applies texturing and/or shading to primitive fragments. Although it is not shown in FIG. 1, the texturing/shading unit 120 may receive texture data from the memory 102 in order to apply texturing to the primitive fragments, as is known in the art. The texturing/shading unit 120 may apply further processing to the primitive fragments (e.g. alpha blending and other processes), as is known in the art in order to determine rendered pixel values of an image. The rendering phase is performed for each of the tiles, such that a whole image can be rendered with pixel values for the whole image being determined. In step S218, the rendered pixel values are provided to the memory 102 for storage in the frame buffer 128. The rendered image can then be used in any suitable manner, e.g. displayed on a display or stored in memory or transmitted to another device, etc.

The tile control lists allow the rendering logic 106 to identify and fetch the relevant primitives for rendering a particular tile (i.e. only those primitives which at least partially cover the tile). However, big primitives that cover most of the rendering space may be present within a large number of tiles. For example, a render of 1920×1080 pixels has 2040 tiles when the tile size is 32×32 pixels. So, in this example (which is not unusual), large primitives can cover thousands of tiles, and as such an identifier of a large primitive may be written into thousands of control lists for the respective tiles. Furthermore, in some examples, the tile size may be different, e.g. the tile size may be 16×16 pixels, in which case the number of tiles covered by a primitive is four times greater than in the example given above in which the tile size is 32×32 pixels.

Writing the primitive identifier data into lots (e.g. thousands) of control lists increases the memory write bandwidth, i.e. the amount of data that is transferred from the geometry processing logic 104 to the memory 102. This transfer of data from the geometry processing logic 104 (which is typically implemented "on-chip") to the memory 102 (which is typically implemented "off-chip" as system memory) can be a relatively slow process (compared to other processes involved in rendering the geometry data). Also, increasing the amount of data in the control lists will increase the minimum memory footprint of the control lists memory 126.

Some applications, such as user interface applications, tend to submit a small number of large primitives to the graphics processing system 100 for rendering, and these applications may be particularly badly affected by the replication of the primitive data to many control lists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of rendering items of geometry in a graphics processing system, wherein the graphics processing system is configured to use a rendering space which is sub-divided into a plurality of first regions, each of the first regions being sub-divided into a plurality of second regions within the rendering space, wherein the method comprises:

processing a plurality of items of geometry including at least one item of geometry which is present within two or more of the first regions, wherein each of the plurality of items of geometry is processed by:
identifying which of the first regions the item of geometry is present within; and
for each identified first region:
determining an indication of the spatial coverage, within the identified first region, of the item of geometry; and
using the determined indication of the spatial coverage within the identified first region to determine whether to add the item of geometry to a first control list for the identified first region or to add the item of geometry to one or more second control lists for a respective one or more of the second regions within the identified first region; and
rendering items of geometry within a second region using:
(i) the first control list for the first region of which the second region is a part, and (ii) the second control list for the second region.

Said using the determined indication of the spatial coverage within the identified first region may comprise: comparing the determined indication of the spatial coverage with a threshold; and using a result of the comparison to determine whether to add the item of geometry to the first control list or to the one or more second control lists.

Said determining an indication of the spatial coverage, within the identified first region, of the item of geometry may comprise determining a sub-polygon representing part of the item of geometry within the identified first region. The method may further comprise: determining a bounding box of the sub-polygon; and comparing a size of the bounding box of the sub-polygon with a threshold size, wherein if the size of the bounding box is below the threshold size then the item of geometry is added to the one or more second control lists. If the size of the bounding box of the sub-polygon is above the threshold size then the method may further comprise comparing the area of the sub-polygon with a threshold area, wherein if the area of the sub-polygon is below the threshold area then the item of geometry is added to the one or more second control lists, and wherein if the area of the sub-polygon is above the threshold area then the item of geometry is added to the first control list.

Said determining an indication of the spatial coverage, within the identified first region, of the item of geometry may further comprise: determining the area of the sub-polygon; and comparing the determined area of the sub-polygon with a threshold area, wherein if the area of the sub-polygon is below the threshold area then the item of geometry is added to the one or more second control lists, and wherein if the area of the sub-polygon is above the threshold area then the item of geometry is added to the first control list.

The area of the sub-polygon may be determined using co-ordinates of the vertices of the sub-polygon which are rounded to quantised positions. The quantised positions may be aligned with boundaries between the second regions or with boundaries between blocks of second regions.

Said determining an indication of the spatial coverage, within the identified first region, of the item of geometry may comprise determining the number of second regions within the first region in which the item of geometry is present. In some examples, if the item of geometry is present within more than a threshold number of the second regions within the first region then the item of geometry is included in the first control list for the first region, and if the item of geometry is present within less than the threshold number of the second regions within the first region then the item of geometry is included in the one or more second control lists for the respective one or more second regions within the first region in which the item of geometry is present. For example, if the item of geometry is present within all of the second regions within the first region then the item of geometry is included in the first control list for the first region, and if the item of geometry is present within fewer than all of the second regions within the first region then the item of geometry is included in the one or more second control lists for the respective one or more second regions within the first region in which the item of geometry is present.

Said using the determined indication of the spatial coverage within the identified first region may comprise: if the determined indication of the spatial coverage indicates that the item of geometry fully covers the identified first region, adding the item of geometry to the first control list, and if the determined indication of the spatial coverage indicates that the item of geometry does not fully cover the identified first region, adding the item of geometry to the one or more second control lists for the respective one or more second regions within the identified first region in which the item of geometry is present. Said rendering items of geometry within a second region may comprise selectively processing items of geometry to determine which sample points within the second region are covered by the items of geometry, wherein said processing may be skipped for items of geometry which are in the first control list since it is known that items of geometry in the first control list cover all of the sample points within the second region.

The items of geometry may be stored in data blocks in accordance with a submission order of the items of geometry, wherein each data block may be associated with a block ID, and wherein entries in the control lists may include a block ID with a geometry indication to identify a data block and to indicate one or more items of geometry from the identified data block.

Said rendering items of geometry within a second region may comprise: choosing, from the first control list for the first region of which the second region is a part and the second control list for the second region, the lowest block ID which has not been previously chosen; and fetching one or more items of geometry from the data block with the chosen block ID in accordance with the geometry indication for said data block with the chosen block ID. If the lowest block ID which has not been previously chosen is in both the first control list for the first region of which the second region is a part and the second control list for the second region, then the method may comprise forming a merged geometry indication which identifies items of geometry from the data block with said lowest block ID based on the geometry indications of said first and second control lists.

The method may further comprise, for each identified first region, if an item of geometry is to be added to the first control list for the identified first region: determining a sub-region mask for the item of geometry to indicate which of a plurality of sub-regions within the first region the item of geometry is present within; and including the sub-region mask for the item of geometry in the first control list. The sub-regions may be second regions within the first region, or the sub-regions may be groups of second regions within the first region.

Adding an item of geometry to a control list may comprise adding an indication of the item of geometry to the control list.

The rendering space may be sub-divided into a plurality of third regions, wherein each of the third regions corresponds to a group of first regions within the rendering space, wherein said processing an item of geometry may comprise:
  identifying which of the third regions the item of geometry is present within; and
  for each identified third region:
    determining an indication of the spatial coverage, within the identified third region, of the item of geometry; and
    using the determined indication of the spatial coverage within the identified third region to determine whether to add the item of geometry to a third control list for the identified third region or to proceed with said processing of the item of geometry; and
  wherein the items of geometry within a second region are rendered further using: (iii) the third control list for the third region of which the first region, of which the second region is a part, is a part.

An item of geometry may be present within a region of the rendering space if, when processed, at least a portion of the processed geometry is present within the region. An item of geometry may be a primitive, a mesh, a patch or a quad. The items of geometry may be within a 3D scene to be rendered from a viewpoint, and wherein said rendering items of geometry may generate image values representing an image of the scene as viewed from the viewpoint.

There is provided a graphics processing system configured to render items of geometry using a rendering space which is sub-divided into a plurality of first regions, each of the first regions being sub-divided into a plurality of second regions within the rendering space, wherein the graphics processing system comprises:
  geometry processing logic configured to process a plurality of items of geometry including at least one item of geometry which is present within two or more of the first regions, wherein the geometry processing logic is configured to process each of the plurality of items of geometry by:
    identifying which of the first regions the item of geometry is present within; and for each identified first region:
  determining an indication of the spatial coverage, within the identified first region, of the item of geometry; and
  using the determined indication of the spatial coverage within the identified first region to determine whether to add the item of geometry to a first control list for the identified first region or to add the item of geometry to one or more second control lists for a respective one or more of the second regions within the identified first region; and
rendering logic configured to render items of geometry within a second region using: (i) the first control list for the first region of which the second region is a part, and (ii) the second control list for the second region.

There may be provided a graphics processing system configured to perform any of the method described herein.

There may be provided a method of rendering primitives in a graphics processing system which is configured to use a rendering space which is subdivided into a plurality of regions, the method comprising:
  a geometry processing phase comprising:
    determining, for each of a plurality of primitives which are present in a region, whether the primitive totally covers the region; and
    storing data for the primitives which are present in the region, wherein the stored data comprises, for each of the primitives which are determined to totally cover the region, data to indicate total coverage of the region; and
  a rendering phase for rendering primitives within the region comprising:
    retrieving the stored data for the primitives which are present in the region;
    selectively processing the primitives which are present in the region based on the retrieved data to determine which sample points within the region are covered by the primitives, wherein if the retrieved data includes data which indicates total coverage of the region for a particular primitive then said processing to determine which sample points within the region are covered by the particular primitive is skipped; and
    determining rendered values at the sample points within the region based on the primitives which cover the respective sample points.

There may be provided a graphics processing system configured to render primitives using a rendering space which is sub-divided into a plurality of regions, wherein the graphics processing system comprises:
  geometry processing logic configured to:
    determine, for each of a plurality of primitives which are present in a region, whether the primitive totally covers the region; and
    store data for the primitives which are present in the region, wherein the stored data comprises, for each of the primitives which are determined to totally cover the region, data to indicate total coverage of the region; and
  rendering logic configured to:
    retrieve the stored data for the primitives which are present in a region;
    selectively process the primitives which are present in the region based on the retrieved data to determine which sample points within the region are covered by the primitives, such that if the retrieved data includes data which indicates total coverage of the region for a particular primitive then the processing to determine which sample points within the region are covered by the particular primitive is skipped; and
    determine rendered values at the sample points within the region based on the primitives which cover the respective sample points.

The graphics processing system may be embodied in hardware on an integrated circuit. There may be provided a method of manufacturing, at an integrated circuit manufacturing system, a graphics processing system. There may be provided an integrated circuit definition dataset that, when processed in an integrated circuit manufacturing system, configures the system to manufacture a graphics processing system. There may be provided a non-transitory computer readable storage medium having stored thereon a computer readable description of a graphics processing system that, when processed in an integrated circuit manufacturing system, causes the integrated circuit manufacturing system to manufacture an integrated circuit embodying a graphics processing system.

There may be provided an integrated circuit manufacturing system comprising: a non-transitory computer readable storage medium having stored thereon a computer readable description of the graphics processing system; a layout processing system configured to process the computer readable description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
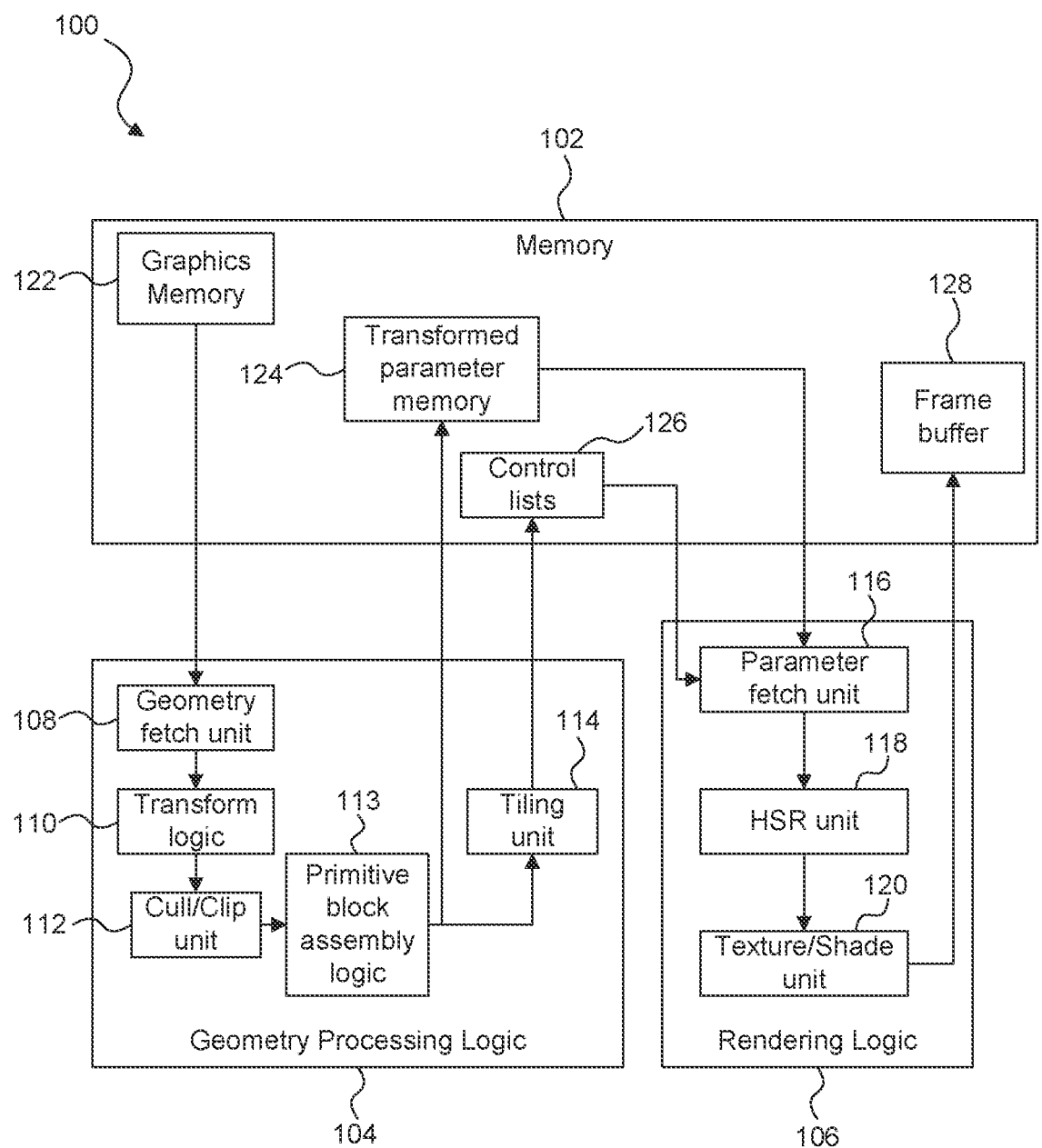
FIG. 1 shows a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Graphics processing systems described herein use multiple "levels" of tiling, such that a tiling resolution can be chosen for adding items of geometry to control lists based on the size of the items of geometry. For example, in a system which uses two "levels" of tiling, the rendering space can be sub-divided into a plurality of first regions (which, as described in more detail below, may be "macro tiles"), wherein each of the first regions is sub-divided into a plurality of second regions. The second regions may correspond to tiles or groups of tiles within the rendering space. A first control list can be formed for each first region, and a second control list can be formed for each second region. An item of geometry which is present within a second region can be added to either the second control list for the second region, or the first control list for the first region of which the second region is a part. The decision as to which of the control lists the item of geometry is added to can be made based on the size of the item of geometry, and more particularly based on the spatial coverage of the item of geometry within the first region. This decision may be made independently for each of the first regions that the item of geometry is present within. In general, an item of geometry is present within a region of the rendering space if, when processed, at least a portion of the processed geometry is present within the region. Some processing performed on an item of geometry (in the geometry processing phase, prior to tiling) might alter the shape and/or position of the item of geometry (e.g. performing vertex shading, geometry shading or tessellation).

For example, large items of geometry which cover a large proportion of a macro tile (or "first region") may be added to the control list for the macro tile, whereas items of geometry which do not cover a large proportion of the macro tile can be added to the control list(s) for the tile(s) (or "second region(s)") within the macro tile in which the items of geometry are present. What is considered to be a "large" proportion of the macro tile can be determined in a number of different ways, as explained in detail in the examples below. For example, a threshold area can be set (where the threshold may for example, be 25%, 33%, 50%, 66%, 75% or even 100% to give just some examples), and the spatial coverage of an item of geometry within a first region can be compared with the threshold to determine whether to add the item of geometry to the first control list for the first region.

It is to be understood that where we refer to adding an item of geometry to a control list, this is intended to cover adding an identifier of the item of geometry to the control list, and not necessarily adding all of the data associated with the item of geometry to the control list.

Adding large items of geometry to control lists for first regions (e.g. to control lists for macro tiles) means that the item of geometry does not need to be added to the separate control lists for the tiles within the first region. Therefore, there is less repetition of a large item of geometry in the control lists stored in the memory. Therefore, the amount of data passed from the (e.g. on-chip) geometry processing logic to the (e.g. off-chip) memory is reduced. In other words, the memory write bandwidth is reduced compared to the prior art system described in the background section above. Furthermore, the memory footprint of the control lists memory can be significantly reduced compared to the prior art system described in the background section above.

The rendering phase for a current render is performed after the geometry processing phase for the current render has completed. In other words, the rendering phase for a current render does not start until all steps of the geometry processing phase for the current render have been completed. The rendering phase may include performing sampling on the primitives to determine primitive fragments which represent the primitives at discrete sample points within the tile, which can also be referred to as "rasterisation". However, the geometry processing phase operates on primitives which represent areas defined by vertices, rather than determining primitive fragments at discrete sample points. In particular, the geometry processing phase does not comprise rasterization, i.e. the geometry processing phase is performed without performing rasterisation on primitives. Rasterisation is not performed for a current render until all steps of the geometry processing phase have been completed for the current render. The geometry processing phase therefore happens before rasterisation.

Figure 2:
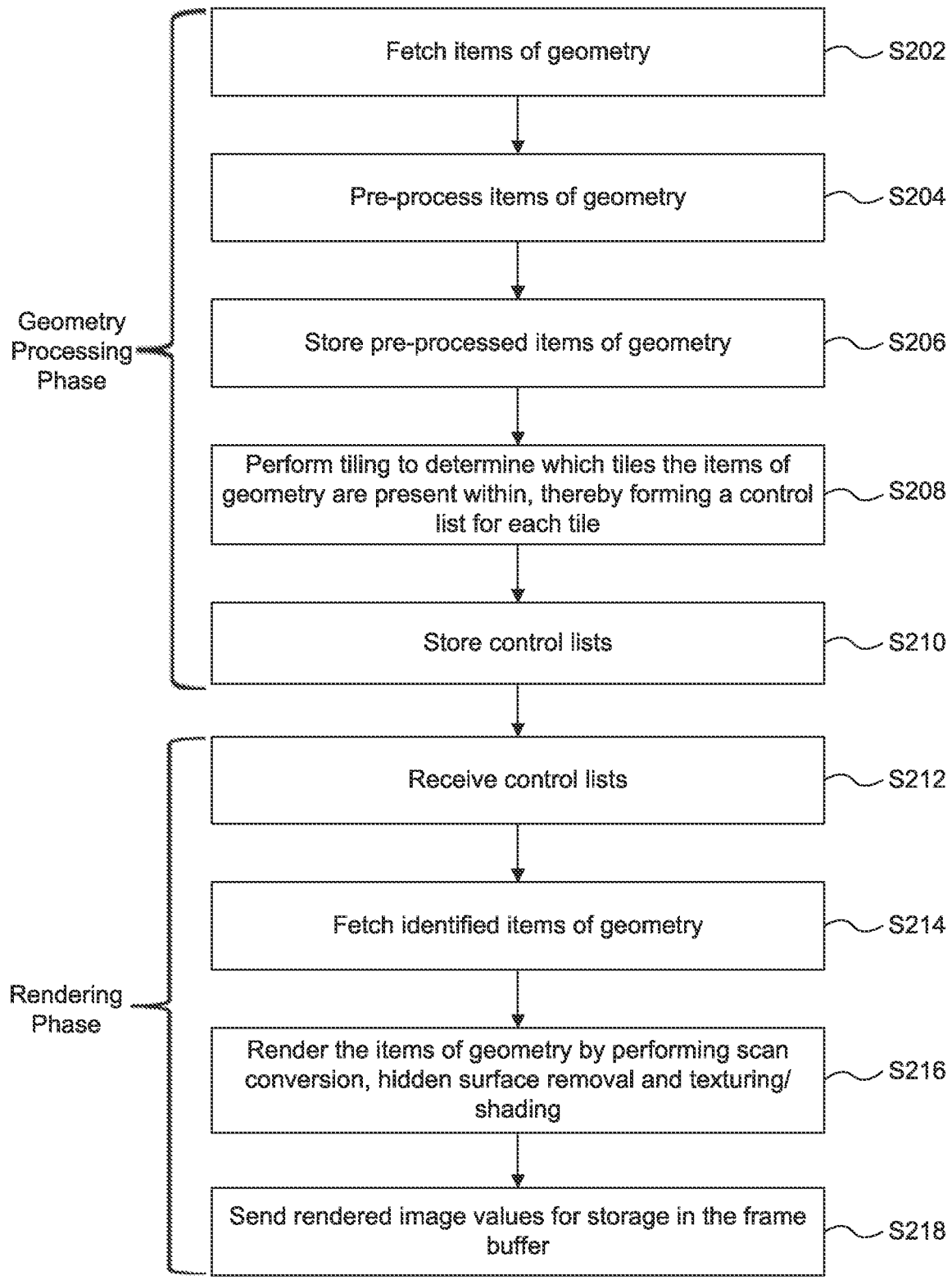
FIG. 2 is a flow chart for a method of rendering items of geometry in the graphics processing system.

The graphics processing system shown in FIG. 1 can be used to implement examples described herein, and the flow chart shown in FIG. 2 describes, at a high-level, the way in which items of geometry are rendered in examples described herein. However, in examples described herein, one or more extra levels of tiling are introduced, wherein identifiers of items of geometry may be added to control lists corresponding to different levels of tiling based on the spatial coverage of the items of geometry. In this sense, examples described herein implement "hierarchical tiling".

In a first example described in detail herein, just two levels of tiling are used, such that the system uses: (i) control lists for macro tiles, and (ii) control lists for tiles. As described in more detail below, in other examples, more than two levels of tiling may be used.

Figure 3:
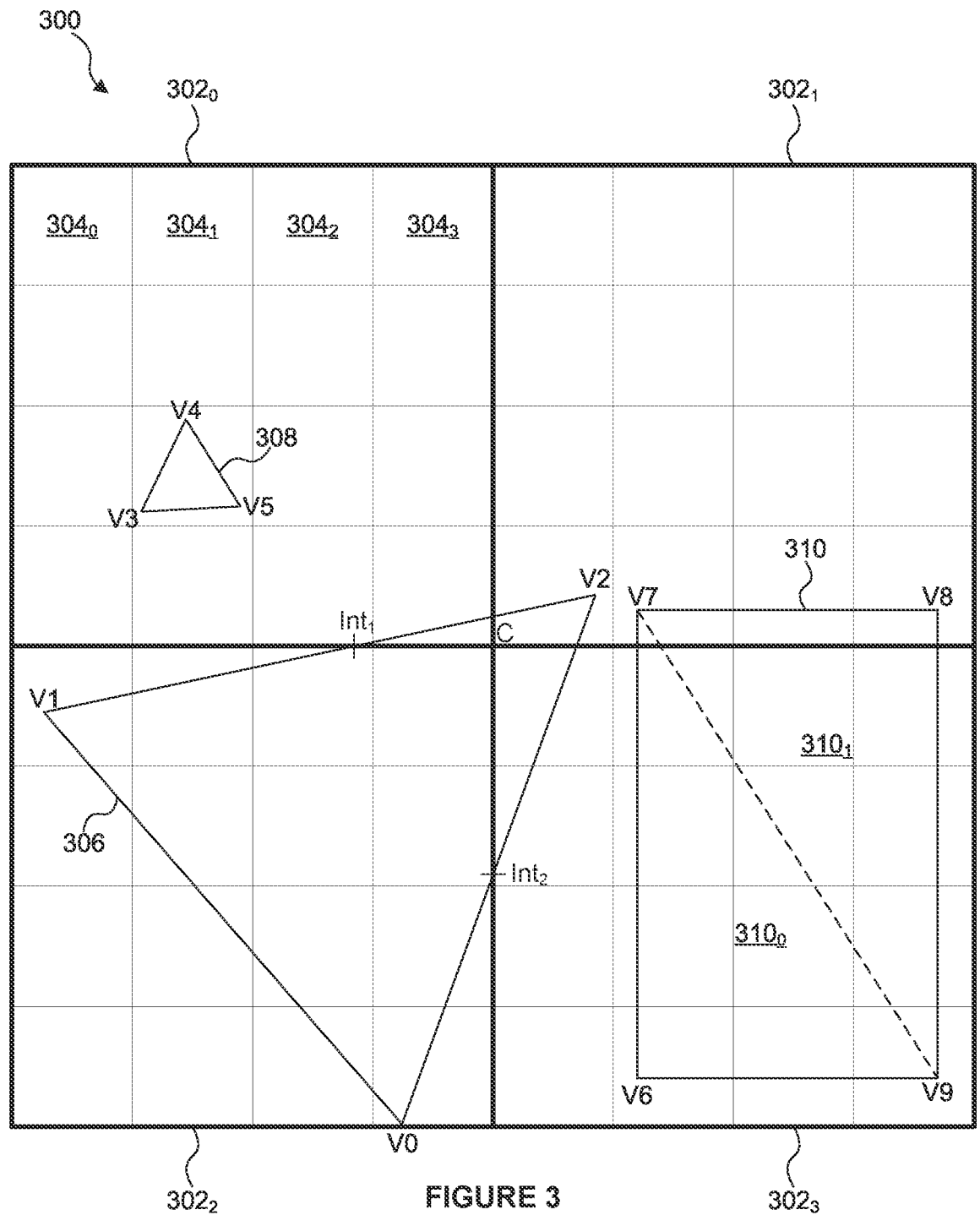
FIG. 3 illustrates items of geometry within a rendering space which is sub-divided into multiple levels of regions.

FIG. 3 shows an example of a rendering space 300 which is sub-divided into four macro tiles (as shown in bold, and referenced as $302_0$, $302_1$, $302_2$ and $302_3$ in FIG. 3) arranged in a 2×2 block. In other examples, the rendering space may be divided into a different number of macro tiles, e.g. sixteen macro tiles arranged in a 4×4 block.

In the example shown in FIG. 3, each macro tile is sub-divided into sixteen tile blocks arranged as a 4×4 block of tile blocks. Four of the tile blocks are referenced in FIG. 3 as $304_0$, $304_1$, $304_2$ and $304_3$. In this example, each tile block represents sixteen tiles arranged as a 4×4 block of tiles. For clarity, the individual tiles are not shown in FIG. 3, but it is noted that each macro tile in this simple example includes 256 tiles, such that the whole rendering space includes 1024 tiles. FIG. 3 shows items of geometry including two triangular primitives 306 and 308, and a quad 310 in the rendering space 300. Primitive 306 is defined by vertices V0, V1 and V2; primitive 308 is defined by vertices V3, V4 and V5; and quad 310 is defined by vertices V6, V7, V8 and V9. The quad 310 is formed from two triangular primitives: primitive $310_0$ defined by vertices V6, V7 and V9; and primitive $310_1$ defined by vertices V7, V8 and V9. The two primitives $310_0$ and $310_1$ share an edge between vertices V7 and V9, such that they form the quad 310 with the edge between vertices V7 and V9 being internal to the quad 310.

In this example, the rendering of items of geometry (e.g. primitives, meshes such as quads, patches, etc.) is performed as outlined in the flow chart of FIG. 2. Steps S202, S204 and S206 are performed as described above, such that items of geometry are fetched by the geometry fetch unit 108 from the graphics memory 122, transformed into the rendering space by the transform logic 110, culled and/or clipped as appropriate by the culling/clipping unit 112, packed into primitive blocks by the primitive block assembly logic 113 and stored in the transformed parameter memory 124 in the memory 102.

Figure 4:
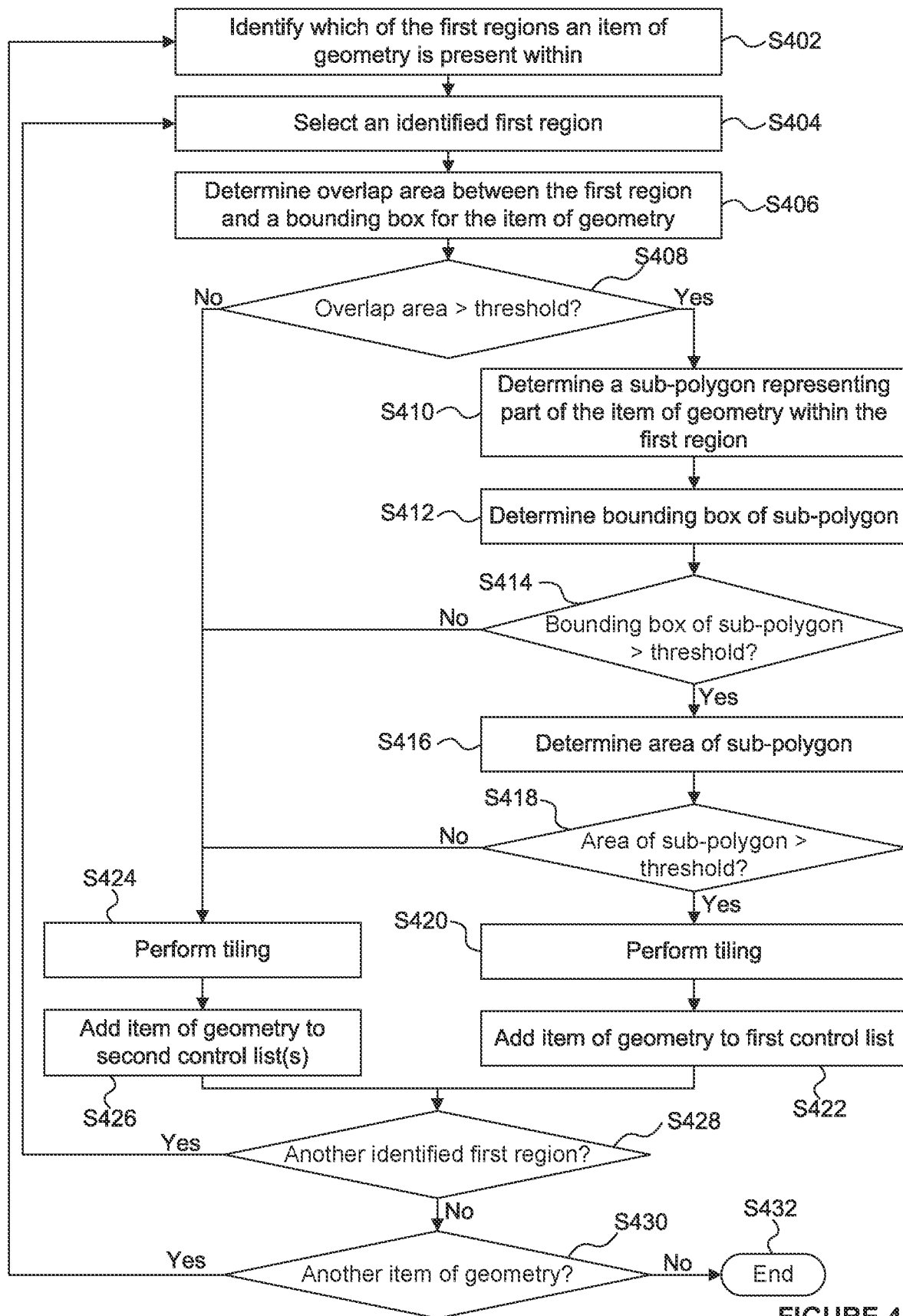
FIG. 4 is a flow chart for a method of adding items of geometry to control lists according to an example described herein.

The step of performing tiling and forming control lists, differs from the corresponding step S208 of the example described above in the background section. In examples described herein, the tiling process performed by the tiling unit 114 comprises implementing a method, as shown in the flow chart of FIG. 4 (instead of performing step S208), to add an item of geometry to one or more first control lists, and/or to one or more second control lists. The method shown in FIG. 4 is performed for each item of geometry which is to be tiled by the tiling unit 114. As described above, an item of geometry may for example be a primitive, or in other examples may be a mesh (e.g. a quad) or a patch. In this example, the "first regions" are the macro tiles $302_0$ to $302_3$, and the "second regions" are the individual tiles (not shown in FIG. 3).

In step S402, an item of geometry is processed to identify which of the first regions (e.g. which of the macro tiles 302), the item of geometry is present within. This can be performed in any suitable manner. There are a number of techniques known in the art for identifying which of the macro tiles 302 an item of geometry is present within. For example, a bounding box (e.g. an axis-aligned bounding box) of the item of geometry may be determined, wherein the item of geometry is not present within any of the macro tiles which do not at least partially overlap with the bounding box of the item of geometry. If the bounding box of the item of geometry does not cross a macro tile boundary in both X and Y directions, then it is known that the item of geometry is present within all of the macro tiles which overlap with the bounding box of the item of geometry. For example, it is known that the item of geometry is present within all of the macro tiles which overlap with the bounding box of the item of geometry if: (i) the bounding box of the item of geometry is completely within a single macro tile such that it does not cross a macro tile boundary, (ii) the bounding box of the item of geometry crosses one or more macro tile boundaries in the X direction but does not cross any macro tile boundaries in the Y direction, or (iii) the bounding box of the item of geometry crosses one or more macro tile boundaries in the Y direction but does not cross any macro tile boundaries in the X direction. However, if the bounding box of the item of geometry crosses macro tile boundaries in both X and Y directions then it is possible that the item of geometry is not present within all of the macro tiles which overlap with the bounding box of the item of geometry. A conservative approach would be to determine that the item of geometry is in each of the macro tiles that the bounding box of the item of geometry overlaps. Alternatively, a "perfect tiling" approach can be used to determine which of the macro tiles 302 which do overlap the bounding box of the item of geometry, the item of geometry is present within. For example, for each of the macro tiles which do overlap with the bounding box of the item of geometry, a test can be performed to determine whether the item of geometry is present within the macro tile. The test may involve, for each edge of the item of geometry, comparing a corner position of the macro tile with the line equation for the edge to determine whether the corner position of the macro tile is inside or outside of the edge.

Following step S402, a set of one or more macro tiles 302 have been identified in which the item of geometry is present. A process can then be performed for each of the identified macro tile(s) (e.g. independently) to determine whether the item of geometry covers a large proportion of each of the macro tiles. If the item of geometry covers a large proportion of a macro tile (such that the item of geometry can be treated as a "big" item of geometry in respect of the macro tile) then it is added to the macro tile control list, but if the item of geometry does not cover a large proportion of a macro tile (such that the item of geometry cannot be treated as a "big" item of geometry in respect of the macro tile) then it is not added to the macro tile control list, and instead it can be added to one or more tile control lists for the tiles within the macro tile. The determination of whether an item of geometry is "big" in respect of a macro tile can be performed in different ways in different examples. For example, steps S406 to S418 can be performed to determine whether an item of geometry is big in respect of a macro tile. The same item of geometry may be treated as a big item of geometry in respect of one macro tile, but as a small item of geometry in respect of another macro tile. In other words, the decision as to whether or not an item of geometry is big may be taken in respect of each macro tile separately, e.g. based on the spatial coverage of the item of geometry with the particular macro tile in question.

In step S404 one of the identified macro tiles 302 is selected. The order in which the identified macro tiles 302 are selected is not important because by the end of the method all of the identified macro tiles will have been selected in a respective iteration of the method.

As will become apparent from the following description of the rest of the method shown in FIG. 4, for each identified first region (e.g. for each macro tile 302 in which the item of geometry is present), an indication of the spatial coverage of the item of geometry, within the identified first region, is determined. This indication is then used to determine whether to add the item of geometry to a first control list for the identified first region (e.g. macro tile) or to add the item of geometry to one or more second control lists for a respective one or more of the second regions (e.g. one or more tiles) within the identified first region. The method steps S406 to S426 are just one example of how this could be implemented.

In step S406, an overlap area between the selected macro tile 302 and a bounding box for the item of geometry is determined. The overlap area is an indication of the spatial coverage of the item of geometry within the selected macro tile 302. However, the overlap area determined in step S406 is a fairly crude approximation of the true overlap between the item of geometry and the selected macro tile 302. In particular, the overlap area determined in step S406 will tend to overestimate the true overlap between the item of geometry and the selected macro tile because the bounding box of the item of geometry tends to be larger than the item of geometry itself. The bounding box used in step S406 may be rectangular. For example, the bounding box used in step S406 may be an axis-aligned bounding box (AABB). It is noted that determining the size of an axis-aligned bounding box for an item of geometry is a very simple process. For example, this can be done by finding the maximum and minimum values of the coordinates in both the x and y directions of the vertices of the item of geometry. These maximum and minimum values in the x and y directions will represent the extents of the bounding box in the x and y directions.

In step S408 the overlap area that was determined in step S406 is compared with a threshold. The threshold may for example be a proportion of the area of a macro tile 302. For example, the threshold could be ¼ of the area of the selected macro tile 302. In other examples, the threshold could be other proportions of the area of a macro tile, or the threshold may be based on something other than a proportion of the area of a macro tile. The granularity with which the boundaries and sizes of the bounding box and the macro tile are determined can be different in different examples. In some examples, the boundaries of the bounding box and the macro tile are determined at tile granularity, such that their sizes are determined as integer numbers of tiles.

If, in step S408, it is determined that the overlap area is not greater than (e.g. is less than) the threshold then the item of geometry is not considered to cover a large proportion of the selected macro tile 302. In other words, if in step S408 it is determined that the overlap area is not greater than the threshold then the item of geometry is not considered to be a "big" item of geometry in respect of the selected macro tile. Therefore, the item of geometry is not added to the control list for the selected macro tile 302, and instead the item of geometry can be added to one or more tile control lists for one or more tiles within the macro tile. Therefore, if in step S408 it is determined that the overlap area is not greater than the threshold then the method passes from step S408 to step S424 which is described below.

However, if in step S408 it is determined that the overlap area is greater than the threshold then the item of geometry might cover a "large" proportion of the selected macro tile 302. In this case the method passes from step S408 to step S410 in which a sub-polygon representing part of the item of geometry within the selected macro tile 302 is determined. A "sub-polygon" is the part of an item of geometry which falls within the selected macro tile 302. Therefore, if an item of geometry is present within two or more macro tiles then a sub-polygon, in respect of one of the macro tiles in which the item of geometry is present, is smaller than the item of geometry of which it is a part. In different examples, the sub-polygon may be determined in different ways. For example, intersection points between edges of the item of geometry and boundaries of the selected macro tile 302 may be determined and used as vertices of the sub-polygon. Furthermore, any vertices of the item of geometry that are within the selected macro tile 302 can be used as vertices of the sub-polygon. Furthermore, corners of the selected macro tile 302 within the item of geometry can be used as vertices of the sub-polygon.

In step S412 a bounding box of the sub-polygon is determined. For example, the bounding box may be rectangular, e.g. an axis-aligned bounding box. As described above, determining an axis-aligned bounding box is a simple process which, for a sub-polygon, involves finding the maximum and minimum x and y values from the coordinates of the vertices of the sub-polygon. It is noted that a sub-polygon is present within a single macro tile only. Furthermore, if the bounding box is an axis-aligned bounding box then the bounding box of a sub-polygon is also present within a single macro tile only.

In step S414 a size of the bounding box of the sub-polygon is compared with a threshold size. In some examples, the bounding box of the sub-polygon is determined at tile granularity, i.e. the boundaries of the bounding box may be aligned with tile boundaries within the selected macro tile. The threshold size may be expressed as a number of tiles. To give an example, the threshold size used in step S414 could be 0.4N, where N is the number of tiles in the selected macro tile. In some examples, a different number of tiles may be used as the threshold. In other examples, the threshold size might be expressed as something other than a number of tiles, e.g. it may be expressed as an area.

If, in step S414, it is determined that the size of the bounding box of the sub-polygon is below the threshold size then the item of geometry is not considered to cover a large proportion of the selected macro tile 302. Therefore, the item of geometry is not added to the macro tile control list for the selected macro tile 302, and instead the item of geometry can be added to one or more tile control lists for one or more tiles within the macro tile, and the method passes to step S424 which is described below.

However, if in step S414 it is determined that the size of the bounding box of the sub-polygon is above the threshold size then the item of geometry might cover a "large" proportion of the selected macro tile 302. In this case the method passes from step S414 to step S416 in which the area of the sub-polygon is determined. A skilled person would know how to determine the area of a sub-polygon. For example, if the sub-polygon is a triangle with vertices at coordinates $(x_0,y_0)$, $(x_1,y_1)$ and $(x_2,y_2)$ then the area of the triangle (A) can be determined by calculating half of the absolute value of the determinant. The value of the determinant (TriDet) for the triangle can be defined as:

$$\text{TriDet} = (x_1 * y_2 - x_2 * y_1) + (x_2 * y_0 - x_0 * y_2) + (x_0 * y_1 - x_1 * y_0).$$

Therefore, the area (A) of the triangle can be calculated as $A = \frac{1}{2}|\text{TriDet}|$. If the sub-polygon comprises multiple triangles then the area of the separate triangles can be determined and then summed to give the area of the sub-polygon.

In step S418 the area of the sub-polygon is compared with a threshold area. In different examples, the threshold area can take different values. For example, the threshold area could be a proportion of the area of the selected macro tile 302. For example, the threshold area could be ¼ of the area of selected macro tile.

Therefore, step S418 could involve determining whether $\frac{1}{2}|\text{TriDet}| > \frac{1}{4}\text{Area}_{MT}$, where $\text{Area}_{MT}$ is the area of the macro tile. In some examples, steps S416 and S418 could be combined into a single step, so that the area A of the sub-polygon is not explicitly determined (i.e. a value of $\frac{1}{2}|\text{TriDet}|$ is never explicitly determined), and instead the method can go straight to determining whether $|\text{TriDet}| > \frac{1}{2}\text{Area}_{MT}$ in order to determine whether the area of the sub-polygon is larger than the threshold area. If the area of the sub-polygon is determined to be larger than the threshold area then the item of geometry is considered to be a large item of geometry in respect of the selected macro tile 302, and the method passes to step S420. However, if the area of the sub-polygon is determined to be not larger than (e.g. determined to be smaller than) the threshold area then the item of geometry is not considered to be a large item of geometry in respect of the selected macro tile 302, and the method passes to step S424.

In some examples, instead of determining the absolute value of TriDet, a signed value of TriDet may be used, and depending on the sign of TriDet, one of two conditions may be used to determine whether the area of the sub-polygon is larger than the threshold area. In particular, the conditions are:

$TriDet > \frac{1}{2} Area_{MT}$, if TriDet>0

$TriDet < \frac{1}{2} Area_{MT}$, if TriDet<0

The calculation for the area of the sub-polygon does not need to be extremely accurate for the purpose of categorising the sub-polygon as either: (i) covering a large area of the selected macro tile 302, or (ii) not covering a large area of the selected macro tile 302. The accuracy with which the determinant (TriDet) is calculated may be different in different examples. For example, the coordinates used to determine the determinant may be specified at sample precision, or at a lower precision, such as at tile granularity, e.g. such that the coordinates are defined in integer numbers of tiles within the selected macro tile 302. In other words, the area of the sub-polygon may be determined using coordinates of the vertices of the sub-polygon which are rounded to quantised positions, and in some examples, the quantised positions may be aligned with boundaries between the tiles or with boundaries between blocks of tiles.

In some examples, the spatial coverage, within the selected macro tile, of the item of geometry may be determined as a number of second regions (e.g. tiles or tile groups) within the selected macro tile in which the item of geometry is present. In some examples, in order for the item of geometry to be considered a large item of geometry with respect to the selected macro tile, the item of geometry may need to be present within more than a threshold number (e.g. all) of the second regions (e.g. tiles or tile groups) within the selected macro tile. In these examples, if the item of geometry is present within more than the threshold hold number (e.g. all) of the second regions within the selected macro tile then the item of geometry is included in the macro tile control list for the selected macro tile, but if the items of geometry is present within less than the threshold number (e.g. fewer than all) of the second regions within the selected macro tile then the item of geometry is included in the one or more second control lists for the respective one or more second regions (e.g. tiles or tile groups) within the selected macro tile in which the item of geometry is present.

All three of the steps S408, S414 and S418 involve comparing an indication of the spatial coverage of the item of geometry, within the selected macro tile, with a threshold, and using a result of the comparison to determine whether to add the item of geometry to the first control list (e.g. the control list for the selected macro tile 302) or to one or more of the control lists for the second regions (e.g. the tile control lists for the tiles within the selected macro tile 302).

If the method passes to step S420 this means that the item of geometry is considered to be a large item of geometry in respect of the selected macro tile 302. In step S420 tiling is performed to determine which sub-regions within the selected macro tile 302 the item of geometry is present within. Methods of performing tiling to determine which regions of a rendering space an item of geometry is present within are known in the art. The tiling may be performed on the item of geometry or on the sub-polygon representing the part of the item of geometry which overlaps with the selected macro tile 302. The "sub-regions" for which tiling is performed in step S420 may be tiles or groups of tiles (e.g. 2×2 groups of tiles). Since step S420 is only performed for items of geometry which are considered to be large within the selected macro tile, the item of geometry is often present within a large proportion (e.g. more than half) of the tiles within the selected macro tile 302 in step S420, and this is one reason why in some examples the sub-regions for which tiling is performed in step S420 may be groups of tiles.

In some examples, step S420 is not performed. Although it can improve the efficiency of the system to perform the tiling of step S420, it does not cause any rendering errors to omit this tiling step.

In some examples, the tiling performed in step S420 also includes determining a sub-region mask for the item of geometry to indicate which of the sub-regions within the selected macro tile 302 the item of geometry is present within. However, in some other examples, the item of geometry will only be included in the macro tile control list for the selected macro tile 302 if it is present within all of the sub-regions within the macro tile; and in these examples, there is no need to perform tiling (i.e. no need to: (i) determine which sub-regions within the selected macro tile 302 the item of geometry is present within, or (ii) determine a sub-region mask) because if an item of geometry is included in the macro tile control list then it is known that the item of geometry is present within all of the sub-regions within the macro tile.

In step S422 the item of geometry is added to the first control list, i.e. to the control list for the selected macro tile 302. In examples described herein, adding an item of geometry to a control list comprises adding an indication of the item of geometry to the control list. As described above, in step S206 primitive blocks comprising data for multiple items of geometry are stored in the transformed parameter memory 124. The indication of the item of geometry that is included in a control list may comprise an indication of the relevant primitive block and an index to identify the item of geometry from the multiple items of geometry which are included in that primitive block. Furthermore, if a sub-region mask for the item of geometry was determined in step S420 then that mask is also included in the control list for the selected macro tile 302. In examples described herein, an entry in the control list for a macro tile relates to one item of geometry and comprises an indication of the item of geometry (e.g. a primitive block ID and an index to locate the item of geometry within the primitive block) and a sub-region mask to indicate which of the sub-regions within the macro tile the item of geometry is present within.

In the examples mentioned above, in which step S420 is not performed, the item of geometry can be included in the control list for the selected macro tile 302 without a sub-region mask, or with a sub-region mask which indicates that the item of geometry is considered to be present within all of the sub-regions within the macro tile. In these examples, the item of geometry will be processed in the rendering phase for all of the tiles of the selected macro tile 302 even if the item of geometry is not present within all of the tiles of the selected macro tile 302. This can cause some reduction in efficiency because the item of geometry may be processed unnecessarily in the rendering phase for some of the tiles, but this will not cause rendering errors because if the item of geometry is not present within a tile then the sampling performed in the rendering phase will determine that the item of geometry is not present at any of the sample points of the tile and therefore will not generate any fragments from the item of geometry in the tile. After step S422 the method passes to step S428 described below.

If the method passes to step S424 (from any of steps S408, S414 or S418) this means that the item of geometry is not considered to be a large item of geometry in respect of the selected macro tile 302. In step S424 tiling is performed to determine which tiles within the selected macro tile 302 the item of geometry is present within. As mentioned above, methods of performing tiling to determine which tiles of a rendering space an item of geometry is present within are known in the art. The tiling may be performed on the item of geometry or on the sub-polygon representing the part of the item of geometry which overlaps with the selected macro tile 302. Since step S424 is only performed for items of geometry which are not considered to be large within the selected macro tile, the item of geometry is often present within only a small proportion (e.g. less than a quarter) of the tiles within the selected macro tile 302 in step S424, which is why in examples described herein the tiling is performed at the level of tiles (rather than at the level of tile groups) in step S424. However, in other examples, the tiling performed in step S424 could be performed at the level of tile groups, e.g. 2×2 groups of tiles.

In step S426 the item of geometry is added to the second control list i.e. one or more tile control lists for the tiles within the selected macro tile which the item of geometry is present within. In examples described herein, adding an item of geometry to a control list comprises adding an indication of the item of geometry to the control list.

The structure of the data within the tile control lists may be different in different examples. For example, an entry in a tile control list for a tile may comprise an indication of a primitive block stored in the transformed parameter memory 124 and data (e.g. a mask) to indicate which of the items of geometry in the primitive block are present within the tile. Therefore, in these examples, an entry in a tile control list for a tile may indicate multiple items of geometry from a primitive block as being present within the tile. Therefore, an entry in a tile control list can be iteratively updated during the geometry processing phase as more items of geometry from a primitive block are processed.

It is noted that in examples described herein the structure of the entries in the tile control lists is different to the structure of the entries in the macro tile control lists. In particular, in examples described herein, an entry in a macro tile control list for a macro tile relates to a single item of geometry (which may be indicated by way of a primitive index in a particular primitive block) and includes an indication (e.g. a mask) of which of the sub-regions (e.g. tile groups or tiles) within the macro tile the item of geometry is present within; whereas in contrast, an entry in a tile control list for a tile relates to a primitive block and includes an indication (e.g. a mask) of which of the items of geometry within the primitive block are present in the tile.

After step S426 the method passes to step S428. In step S428 it is determined whether there is another macro tile which was identified in step S402 which has not yet been selected in step S404. If there is still one or more identified macro tile which has not yet been selected then the method passes back to step S404 so that another macro tile can be selected and processed in respect of the item of geometry.

If it is determined in step S428 that there is not another macro tile which was identified in step S402 but which has not yet been selected in step S404 then the method passes to step S430. In step S430 it is determined whether there is another item of geometry to process in the current render. If there is, then the method passes back to step S402 and the method is performed in respect of another item of geometry. If it is determined in step S430 that there are no more items of geometry to process then the process ends at step S432. At this point all of the items of geometry of a scene for the current render have been processed and the control lists have been determined. As indicated in step S210 of FIG. 2, the control lists can then be stored, thereby completing the geometry processing phase.

We will now run through some examples of how some of the items of geometry such as the primitives 306 and 308 and the quad 310 shown in FIG. 3 would be processed by the method shown in FIG. 4. For primitive 306, all four of the macro tiles $302_0$, $302_1$, $302_2$ and $302_3$ will be identified in step S402 because the primitive 306 is present in all four of these macro tiles. The first macro tile $302_0$ will be selected in step S404. In step S406 a bounding box for the primitive 306 will be determined and the overlap area between this bounding box and the macro tile $302_0$ will be determined. From looking at FIG. 3 it can be appreciated that this overlap area will be small, in particular it will be less than the threshold used in step S408, e.g. less than ¼ of the area of the macro tile $302_0$. Therefore, the method passes to S424 the primitive 306 will be added to the second control list i.e. tile control lists for the tiles that it covers within the macro tile $302_0$, but it will not be added to the macro tile control list for the macro tile $302_0$. For macro tile $302_1$, it can be appreciated from looking at FIG. 3 that the overlap area between the bounding box of the primitive 306 with the macro tile $302_1$ will be less than the threshold, e.g. less than ¼ of the area of the macro tile $302_1$, so the primitive 306 will be added to the tile control lists for the tiles that it covers within the macro tile $302_1$, but it will not be added to the macro tile control list for the macro tile $302_1$. However, for macro tile $302_2$ the bounding box of the primitive 306 will overlap with almost all of the macro tile $302_2$, so the method passes to step S410 in which a sub-polygon is determined representing the part of the primitive 306 which is within the macro tile $302_2$. The vertices of this sub-polygon are: (i) V0, (ii) V1, (iii) the intersection point ($Int_1$) between the edge of the primitive 306 between vertices V1 and V2 and the boundary between macro tiles $302_0$ and $302_2$, (iv) the intersection point ($Int_2$) between the edge of the primitive 306 between vertices V0 and V2 and the boundary between macro tiles $302_2$ and $302_3$, and (v) the point (C) in the centre of the rendering space 300 on the corners of the macro tiles $302_0$, $302_1$, $302_2$ and $302_3$. In step S412 a bounding box of the sub-polygon is determined and in step S414 it is determined that the size of this bounding box is greater than the threshold. The method passes to step S416 in which the area of the sub-polygon is determined, e.g. by breaking the sub-polygon down into a plurality of triangles and determining the area of each triangle as described above based on the determinant calculated using the positions of the vertices of the triangle. The areas of the different triangles can be summed to give the area of the sub-polygon. In step S418 the area of the sub-polygon is compared with the threshold area (e.g. ¼ of the area of the macro tile), and for primitive 306 it can be seen from FIG. 3 that the area of the sub-polygon in macro tile $302_2$ covers more than ¼ of the area of the macro tile $302_2$, so in this example the method passes to steps S420 and S422 such that the primitive 306 will be added to the macro tile control list for the macro tile $302_2$, but it will not be added to the tile control lists for any of the tiles within the macro tile $302_2$. For macro tile $302_3$, it can be appreciated from looking at FIG. 3 that the overlap area between the bounding box of the primitive 306 with the macro tile $302_3$ will be less than the threshold, e.g. less than ¼ of the area of the macro tile $302_3$, so the primitive 306 will be added to the tile control lists for the tiles that it covers within the macro tile $302_3$, but it will not be added to the macro tile control list for the macro tile $302_3$.

As another example, for primitive 308, only the macro tile $302_0$ will be identified in step S402, and then selected in step S404. In step S406 a bounding box for the primitive 306 is determined, and this bounding box covers only a single tile group 304 within the macro tile $302_0$. Therefore, the overlap area between the bounding box of the primitive 308 and the macro tile $302_0$ will be small, in particular it will be less than the threshold used in step S408, e.g. less than ¼ of the area of the macro tile $302_0$. Therefore, the primitive 308 will be added to the tile control lists for the tiles that it covers within the macro tile $302_0$, but it will not be added to the macro tile control list for the macro tile $302_0$. Since the primitive 308 is not present within any of macro tiles $302_1$, $302_2$ or $302_3$, it will not be added to the macro tile control lists for these macro tiles or to any of the tile control lists for any of the tiles within these macro tiles.

As another example, the quad 310 is treated as an item of geometry, which is formed from two triangular primitives $310_0$ and $310_1$. For quad 310, the macro tiles $302_1$ and $302_3$ (but not macro tiles $302_0$ or $302_2$) will be identified in step S402. The macro tile $302_1$ will be selected first in step S404. In step S406 a bounding box for the quad 310 will be determined and the overlap area between this bounding box and the macro tile $302_1$ will be determined. From looking at FIG. 3 it can be appreciated that this overlap area will be small, in particular it will be less than the threshold used in step S408, e.g. less than ¼ of the area of the macro tile $302_1$. Therefore, the quad 310 will be added to the tile control lists for the tiles that it covers within the macro tile $302_1$, but it will not be added to the macro tile control list for the macro tile $302_1$. However, for macro tile $302_3$ the bounding box of the quad 310 will overlap with most of the macro tile $302_3$, so the method passes to step S410 in which a sub-polygon is determined representing the part of the quad 310 which is within the macro tile $302_3$. In step S412 a bounding box of the sub-polygon is determined and in step S414 it is determined that the size of this bounding box is greater than the threshold. The method passes to step S416 in which the area of the sub-polygon is determined, e.g. by breaking the sub-polygon down into a plurality of triangles and determining the area of each triangle as described above based on the determinant calculated using the positions of the vertices of the triangle. The areas of the different triangles can be summed to give the area of the sub-polygon. In step S418 the area of the sub-polygon is compared with the threshold area (e.g. ¼ of the area of the macro tile), and for quad 310 it can be seen from FIG. 3 that the area of the sub-polygon in macro tile $302_3$ covers more than ¼ of the area of the macro tile $302_3$, so in this example the method passes to steps S420 and S422 such that the quad 310 will be added to the macro tile control list for the macro tile $302_3$, but it will not be added to the tile control lists for any of the tiles within the macro tile $302_3$.

Rendering Phase

As described above, the transformed items of geometry are stored in primitive blocks (which may just be referred to herein generally as "data blocks") in accordance with a submission order of the items of geometry. That is, an application submits in the items of geometry (e.g. primitives) to the graphics processing system 100 to be rendered in a particular order (referred to as "submission order") and this order is maintained when the items of geometry are stored in the primitive blocks. Each primitive block is associated with a primitive block ID (which may just be referred to herein generally as a "block ID"). Each entry in the control lists includes: a primitive block ID to identify a primitive block, and (ii) a primitive indication to indicate one or more primitives from the identified primitive block. A primitive indication included in a macro tile control list may for example comprise a primitive index which indicates which one of the primitives within the primitive block the entry relates to. A primitive indication included in a tile control list may for example comprise a primitive mask which indicates which one or more of the primitives within the primitive block the entry relates to.

Figure 5A:
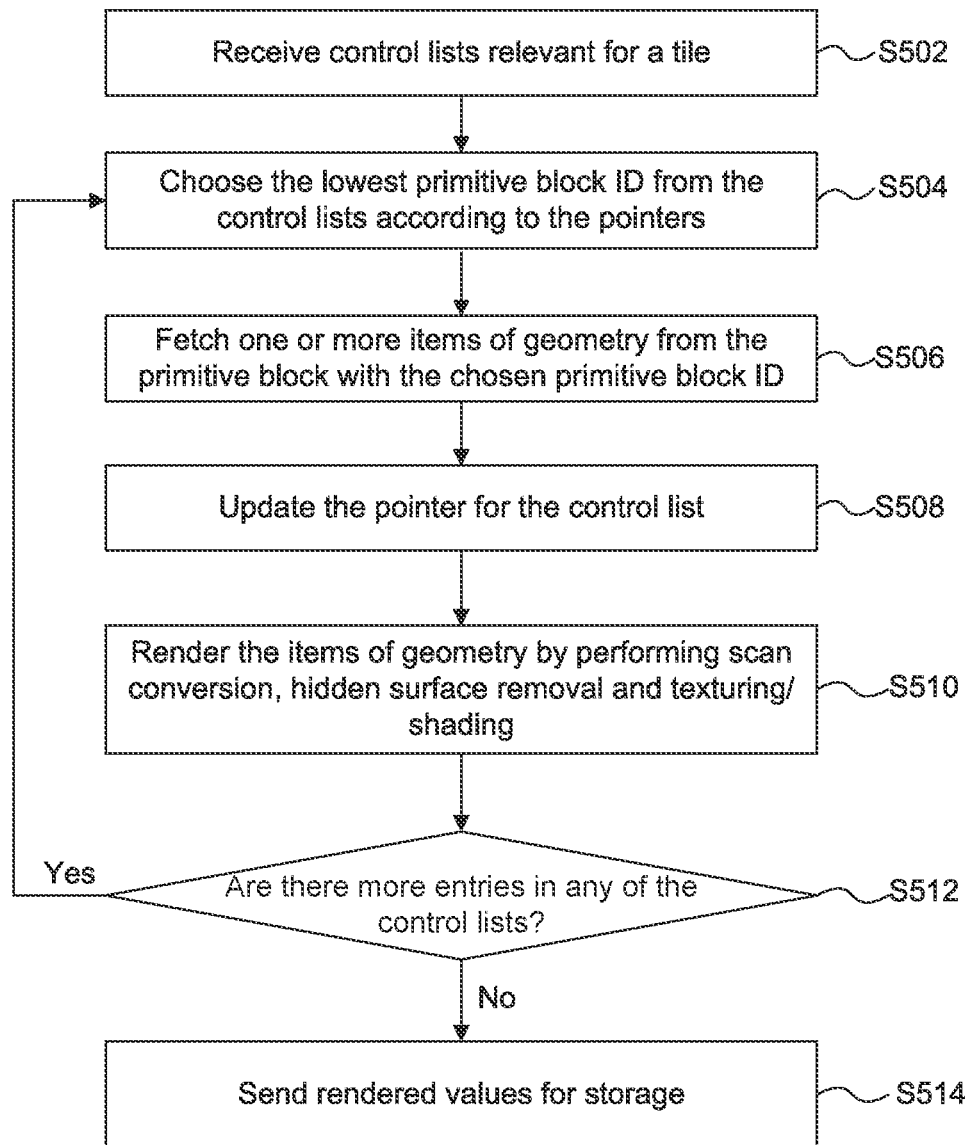
FIG. 5a is a flow chart for a method of fetching and rendering items of geometry in a tile when there are multiple control lists for the tile.

The rendering phase, performed by the rendering logic, uses a method shown in the flow chart of FIG. 5a. This method follows a similar approach to that shown in steps S212 to S218 of FIG. 2 described above. However, now for each tile that is to be rendered there may be more than one control list which indicates items of geometry which are present within that tile. For example, there may be a tile control list for the tile and a macro tile control list for the macro tile which the tile is within. Therefore, the items of geometry within a tile may be rendered using: (i) the macro tile control list for the macro tile of which the tile is a part, and (ii) the tile control list for the tile. In some examples, there may be more than two control lists which are relevant for a particular tile, and in these examples the items of geometry within a tile may be rendered using these more than two control lists.

Therefore, the rendering phase comprises, in step S502, fetching the control lists which are relevant for rendering a tile (e.g. the tile control list for the tile and the macro tile control list for the macro tile of which the tile is a part).

Figures 5B, 6:
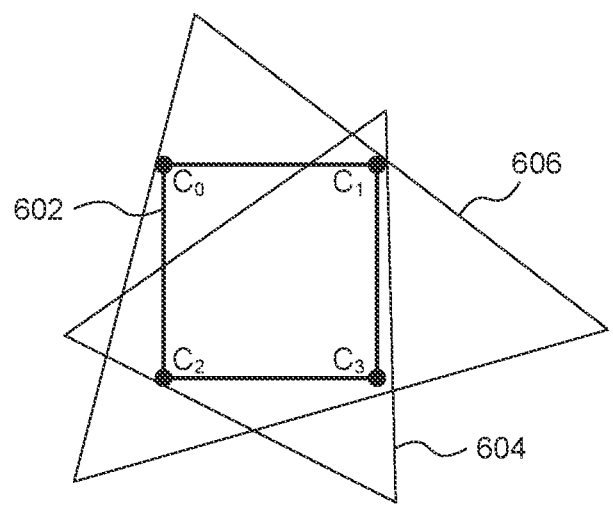
FIG. 5b shows an example of a macro tile control list and a tile control list.
FIG. 6 illustrates an example of a region within a rendering space and two primitives which are present within the region.

The process of fetching the items of geometry is more complex now that there is more than one control list identifying items of geometry to be fetched for the rendering of a tile. In particular, the items of geometry should be fetched according to the submission order in which they were submitted to the graphics processing system. For example, a tile may be associated with a macro tile control list 522 and a tile control list 524 as shown in FIG. 5b. The two control lists are processed together in parallel. A pointer is maintained for each of the control lists. For example, the pointer 526 is maintained for the macro tile control list 522 and the pointer 528 is maintained for the tile control list 524. The pointers indicate the current entry of the control list being processed. Initially both of the pointers 526 and 528 point to the first entry in the respective control lists (as shown in FIG. 5b). Step S504 of the method comprises choosing, from the two control lists, the lowest primitive block ID which has not been previously chosen (i.e. the primitive block ID of the entry indicated by the pointer). In step S506 one or more items of geometry are fetched from the primitive block with the chosen primitive block ID in accordance with the primitive indication for the primitive block with the chosen primitive block ID. When an entry has been chosen from a control list then in step S508 the pointer for that control list is modified (i.e. updated) to point to the next entry in that control list.

In step S510, the fetched items of geometry are processed to thereby render the items of geometry, e.g. by performing sampling on primitives to determine primitive fragments at sample positions within the tile and then performing hidden surface removal and texturing and/or shading on the fragments to determine rendered values. As mentioned above, sampling may be referred to as "rasterisation" or "scan conversion". In step S512, it is determined whether there are more entries in either of the control lists 522 and 524. This can be done by determining whether the pointers have reached the ends of the respective control lists. If there is at least one more entry in either control list then the method passes back to step S504 so that the next entry can be processed. If it is determined in step S512 that there are no more entries in the control lists then the method passes to step S514. In step S514, the rendered values can then be sent for storage. The rendered values may represent an image of the scene as viewed from a viewpoint. In some examples, the rendered values may represent a texture which can be stored in a texture memory, e.g. so that the rendered texture can be applied to a surface within a scene which is subsequently rendered.

Let us assume that, in the example shown in FIG. 5b, the current tile being rendered is in the first tile block of the macro tile. The first entry in the tile control list 524 will be chosen first (in step S504) because it has the lowest primitive block ID. The primitive mask indicates that the second, fourth and sixth primitives from primitive block 1 will be fetched. Next, the first entry in the macro tile control list 522 will be chosen and the seventh primitive from primitive block 2 will be fetched, because the tile block mask in the entry has a '1' in the first position meaning that entry in the macro tile control list 522 is relevant for rendering the current tile. The second entry in the macro tile control list 522 has a '0' in the first position of the tile block mask, so this entry is not relevant for the current tile, so the pointer 526 is moved on to the third entry in the macro tile control list 522. Next, the third entry in the macro tile control list 522 will be chosen because it has a lower primitive block ID than that of the second entry in the tile control list 524, and the first primitive from primitive block 3 will be fetched. Next, the second entry in the tile control list 524 will be chosen because it has a lower primitive block ID than that of the fourth entry in the macro tile control list 522, and the first, fourth and eighth primitives from primitive block 4 will be fetched.

Next, the pointer 526 will be pointing to the fourth entry in the macro tile control list 522 and the pointer 528 will be pointing to the third entry in the tile control list 524. These entries both have the same primitive block ID. In this situation the primitive index in the macro tile control list entry is merged with the primitive mask from the tile control list entry to determine which primitives are to be fetched from the primitive block. In other words, if the lowest primitive block ID which has not been previously chosen is in both the macro tile control list 522 and the tile control list 524 (i.e. if the pointers 526 and 528 are pointing to entries with matching primitive block IDs) then a merged primitive mask is formed which identifies primitives from the primitive block with said lowest primitive block ID based on the primitive index in the entry of the macro tile control list 522 and the primitive mask in the entry of the tile control list 524. In this example, the merged primitive mask for primitive block 5 will be 01000010. Therefore, the second and seventh primitives from primitive block 5 will be fetched. It is noted that the primitive indexing in this example starts at 1, such that, for example, the "first" primitive from a primitive block has a primitive index of 1 and the "second" primitive from a primitive block has a primitive index of 2, etc. In other examples, the primitive indexing could start at zero, such that, for example, the "first" primitive from a primitive block would have a primitive index of 0 and the "second" primitive from a primitive block has a primitive index of 1, etc.

Then finally in the example shown in FIG. 5b, the fourth entry in the tile control list 524 will be chosen and the first, fifth, seventh and eighth primitives from primitive block 6 will be fetched.

Hierarchical Tiling With More Than Two Levels

In the examples described above with reference to FIGS. 4, 5a and 5b there are just two levels of tiling, i.e. two levels at which an item of geometry may be added to a control list: at a macro tile level or at a lower level (e.g. a tile level or a tile group level). However, in other examples, there may be more than two levels of tiling. In these examples, the method will determine whether an item of geometry can be considered to be "large" at the top level of tiling, i.e. in respect of the largest areas of the rendering space for which control lists are being created. If the item of geometry is large in respect of a top level region then the item of geometry is added to the control list of that top level region, and is not added to the control lists of lower-level regions that are within the top level region. However, if the item of geometry is not large in respect of a top level region then the method can step down a level and determine whether the item of geometry is large in respect of any of the regions at the new level. The determination as to whether an item of geometry is large in respect of a region can be performed as described above (e.g. by comparing a bounding box or an area with a threshold), irrespective of the level at which the region sits in the hierarchy of regions. The hierarchy can have many levels.

For example, where there are three levels of tiling, the rendering space may be sub-divided into a plurality of top level regions (e.g. macro tiles), each of the macro tiles can be sub-divided into a plurality of middle level regions (e.g. tile groups representing 4×4 groups of tiles), and each of the tile groups can be sub-divided into a plurality of bottom level regions (e.g. tiles). In this example, the method can identify which of the top level regions the item of geometry is present within. For each identified top level region, an indication of the spatial coverage of the item of geometry, within the identified top level region, is determined (e.g. as an overlap between the identified top level region and a bounding box or an area of the item of geometry). The indication of the spatial coverage is used to determine whether to add the item of geometry to a top level control list (e.g. a macro tile control list) for the identified top level region (e.g. macro tile) or to proceed with processing the item of geometry at a lower level of tiling (e.g. at the middle level). At the middle level of tiling, the method identifies which of the middle level regions (e.g. tile groups) the item of geometry is present within. For each identified middle level region, an indication of the spatial coverage of the item of geometry, within the identified middle level region, is determined (e.g. as an overlap between the identified middle level region and a bounding box or an area of the item of geometry). The indication of the spatial coverage is used to determine whether to add the item of geometry to a middle level control list (e.g. a tile group control list) for the identified middle level region or to add the item of geometry to one or more control lists at the bottom level (e.g. tile control lists for tiles). In examples such as this, in which there are three levels of tiling: the middle level regions (e.g. tile groups) may be referred to as "first regions" and the middle level control lists may be referred to as "first control lists"; the bottom level regions (e.g. tiles) may be referred to as "second regions" and the bottom level control lists may be referred to as "second control lists"; and the top level regions (e.g. macro tiles) may be referred to as "third regions" and the top level control lists may be referred to as "third control lists".

In examples where there are more than two (e.g. three) levels at which the control lists are created, during the rendering phase, when rendering a particular tile, there may be more than two (e.g. three) control lists which are relevant for rendering the particular tile, and all of these control lists are processed together. A pointer is maintained for each of the control lists to keep track of which of the items of geometry from the different control lists have been processed already, to ensure that the items of geometry are rendered in submission order for the particular tile, even though the items of geometry may be included in multiple separate control lists. For example, if there are three levels of tiling, with control lists being created at the macro tile level, the tile group level and the tile level, when a particular tile is rendered the three control lists which are used are the tile control list for the particular tile, the tile group control list for the tile group of which the particular tile is a part, and the macro tile control list for the macro tile of which the tile group, of which the particular tile is a part, is a part.

Total Coverage

In some examples, as described above, an item of geometry might only be included in a first control list for a first region (e.g. a macro tile control list for a macro tile) if the item of geometry totally covers the first region. Therefore, in these examples, where there are just two levels of tiling (e.g. a macro tile level and a tile level) an indication of the spatial coverage of an item of geometry in respect of a macro tile is determined, and if the determined indication of spatial coverage indicates that the item of geometry fully covers the macro tile then the item of geometry is added to the macro tile control list for that macro tile, whereas if the determined indication of spatial coverage indicates that the item of geometry does not fully cover the macro tile then the item of geometry is added to the one or more tile control lists for the one or more tiles within the macro tile in which the item of geometry is present.

In these examples, an item of geometry is only included in the macro tile control list if it totally covers the macro tile. For example, the method can include determining whether the item of geometry fully covers (i.e. totally covers) the macro tile by determining whether the item of geometry overlaps with the entire area of the macro tile, or by determining whether the item of geometry is present at every sample position within the macro tile. As described above, one of the steps performed on an item of geometry during the rendering phase for rendering a particular tile is to perform sampling on the item of geometry in order to determine at which of the sample positions within the particular tile the item of geometry is present. However, in these examples in which an item of geometry is only included in the macro tile control list if it totally covers the macro tile, then the presence of the item of geometry in the macro tile control list means that the item of geometry is present at every sample position within the macro tile. Therefore, when rendering is performed for a particular tile within the macro tile, the step of performing sampling on an item of geometry to determine at which of the sample positions within the particular tile the item of geometry is present can be skipped for items of geometry which are included in the relevant macro tile control list since it is already known that these items of geometry will be present at every sample position within the particular tile. In other words, the rendering of items of geometry within a tile can comprise selectively processing items of geometry (e.g. by performing sampling on an item of geometry) to determine which sample points within the tile are covered by the items of geometry, wherein this processing (e.g. sampling the item of geometry) is skipped for items of geometry which are in the macro tile control list since it is known that items of geometry in the macro tile control list cover all of the sample points within the tile. Skipping the processing involved in sampling the item of geometry, in order to determine at which of the sample positions within the particular tile the item of geometry is present, can reduce the amount of processing required during the rendering phase, which can have technical benefits such as reduced power consumption and reduced latency.

However, in some examples, as described above, items of geometry can be included in a macro tile control list if they are "large" in respect of the respective macro tile even if the item of geometry does not entirely cover the macro tile. Furthermore, in all of the examples described above, an item of geometry may be included in a tile control list for a tile in which it is present, irrespective of whether the item of geometry completely covers the tile. Therefore, there are situations in which the presence of an item of geometry within a control list for a region is not enough information to determine whether the item of geometry totally covers the region. Therefore, in some examples, some extra data can be stored for an item of geometry, e.g. in the control list for a region, to indicate whether the item of geometry totally covers the region. This extra data may be a flag (e.g. a one-bit flag) for each item of geometry included in a control list to indicate whether the item of geometry totally covers the region with which the control list is associated.

The concept of determining, during the geometry processing phase, whether an item of geometry totally covers a region, and if it does, skipping the processing involved in performing sampling on the item of geometry (i.e. in order to determine at which of the sample positions within the particular tile the item of geometry is present) during the rendering phase can be used in a system as described above which uses multiple levels of tiling, but it can also be used in other systems, e.g. systems which do not use multiple levels of tiling, i.e. systems which use a single level of tiling.

FIG. 6 shows an example of a region 602 of a rendering space and two primitives 604 and 606. The region 602 could, for example, be a tile or a group of tiles. In the example shown in FIG. 6 the region 602 is square, but in other examples the region could be other shapes, e.g. rectangular. In the example shown in FIG. 6 the two primitives 604 and 606 are triangular, but in other examples the primitives could be other shapes.

Figure 7:
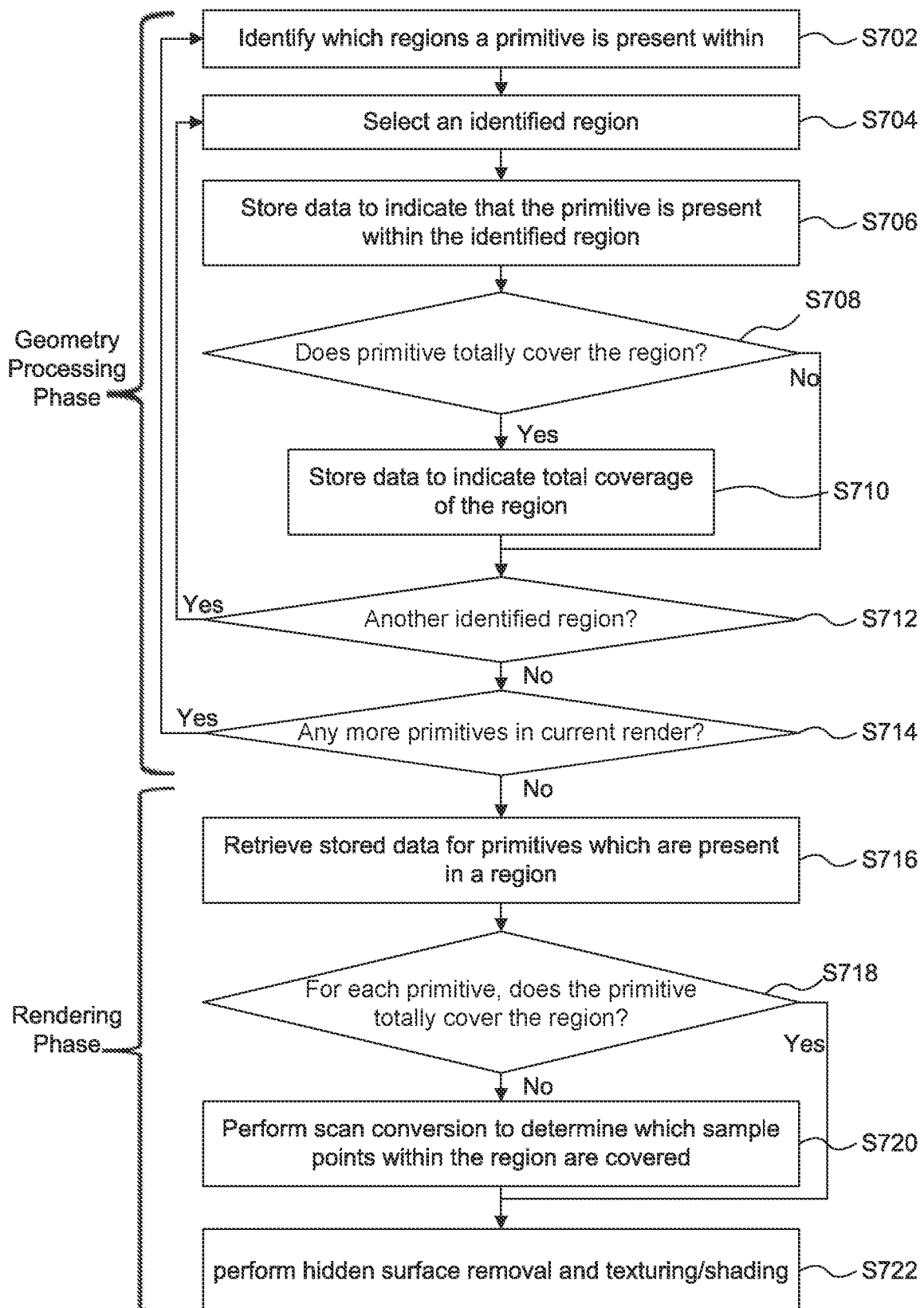
FIG. 7 is a flow chart for a method of rendering primitives where some of the primitives may totally cover some of the regions within a rendering space.

A method of rendering primitives which uses the concept of skipping the sampling processing (i.e. in order to determine at which of the sample positions within the particular tile the primitive is present) for primitives which totally cover a region of the rendering space is described with reference to the flow chart of FIG. 7. Similar to the examples described above, the method shown in FIG. 7 comprises a geometry processing phase performed by geometry processing logic (e.g. geometry processing logic 104) followed by a rendering phase performed by rendering logic (e.g. rendering logic 106). In the geometry processing phase the geometry (e.g. primitives) are processed to determine which primitives (and other items of geometry) are present within which regions (e.g. tiles, tile groups or macro tiles) of the rendering space. Then in the rendering phase, a region can be rendered by retrieving all of the geometry which is relevant for that region (but not geometry which is not relevant for that region) and then the retrieved geometry can be processed to determine rendered values for each of the sample points within the region. As described above, there may be one or more sample points for each pixel in a region.

In step S702, a primitive is processed (e.g. by performing "tiling") to identify which regions (e.g. tiles) the primitive is present within. Methods of performing tiling are known in the art, some of which are described above.

In step S704 one of the identified regions is selected.

In step S706 data to indicate that the primitive is present within the identified region is stored. For example, primitive indication data may be stored (e.g. in a control list) for the region to indicate the determined primitives for the region.

In step S708, the geometry processing logic determines whether the primitive totally covers the region. If it is determined in step S708 that the primitive totally covers the region then in step S710 data is stored for the primitive to indicate total coverage of the region. For example, the stored data for the primitive may comprise a flag to indicate total coverage of the region. However, if it is determined in step S708 that the primitive does not totally cover the region then step S710 is bypassed, i.e. not performed, and the method passes from step S708 to step S712. In some examples, if it is determined that the primitive does not totally cover the region then data may be stored for the primitive to indicate that it does not totally cover the region. The stored data (e.g. the flag) may be stored in the control list for the region with the primitive indication data which indicates which primitives are present in the region. Therefore, the control list for a region may include indications of the primitives which are present within that region, and for each indicated primitive there may be an indication (e.g. a one bit flag) to indicate whether or not the primitive totally covers the region.

The way in which step S708 is performed, i.e. the way in which it is determined whether the primitive totally covers the region, may be different in different examples. For example, in step S708 the region may be considered to be an area, such that the step of determining whether a primitive totally covers a region comprises determining whether the primitive covers the entire area of the region. In some alternative examples, the positions of the sample points within the region may be taken into account, such that the step of determining whether a primitive totally covers a region comprises determining whether the primitive covers every sample point in the region.

Step S708 of determining whether a primitive totally covers a region may comprise processing each edge of the primitive by: (i) determining which of the corners of the region is most likely to be outside of the edge, and (ii) determining whether the determined corner is inside the edge. Methods of performing these two determinations are known in the art. The determination of whether the determined corner is inside the edge may use a calculation involving a line equation describing the edge and a position of the determined corner. If it is determined that all of the determined corners are inside the respective edges then the primitive totally covers the region, but if for any of the edges of the primitive, the determined corner is outside of the edge then the primitive does not totally cover the region. For example, with reference to FIG. 6, for primitive 604, for the top left edge, the corner $C_0$ is the corner of the region 602 which is most likely to be outside of the edge, and it can be seen that this corner $C_0$ is outside of the top left edge of primitive 604. As such, it is determined that the primitive 604 does not totally cover the region 602.

For primitive 606, for the left edge, it will be determined that corner $C_0$ is the most likely to be outside the edge, but it will be determined that corner $C_0$ is inside the left edge of primitive 606. Similarly, for the top right edge of the primitive 606 it will be determined that corner $C_1$ is the most likely to be outside the edge, but it will be determined that corner $C_1$ is inside the top right edge of primitive 606. Similarly, for the bottom edge of the primitive 606, it will be determined that corner $C_3$ is the most likely to be outside the edge, but it will be determined that corner $C_3$ is inside the bottom edge of primitive 606. Therefore, it will be determined that the primitive 606 totally covers the region 602.

The processing (e.g. evaluating line equations) involved in performing the calculations used to determine whether a corner point is inside an edge can be significant, e.g. in terms of the power consumption and latency of the system, particularly since they may be performed for many (e.g. millions of) primitives and in respect of many (e.g. thousands of) regions. Therefore, in some examples, at least some of these calculations can be avoided in some situations. In particular, a simple test can establish that a primitive definitely does not fully cover a region. When a triangular primitive totally covers a region (wherein the region is rectangular (where the term "rectangular" includes square)), the dimensions of the bounding box of the primitive must be greater than or equal to the size of the respective dimensions of the region, and at least one of the dimensions of the bounding box must be greater than or equal to twice the respective dimension of the region. Therefore, the step of determining whether a primitive totally covers a region may include identifying that a primitive definitely does not fully cover a region by determining a bounding box of the primitive (e.g. an axis-aligned bounding box, i.e. a rectangular bounding box which is aligned with the orientation of the rectangular region), determining a size of the bounding box in both horizontal and vertical directions, and then comparing the size of the bounding box in the horizontal direction ($BB_x$) with a size of the region in the horizontal direction ($R_x$), and comparing the size of the bounding box in the vertical direction ($BB_y$) with a size of the region in the vertical direction ($R_y$). It is determined that the primitive does not totally cover the region if any of the following conditions are satisfied: (i) $BB_x < R_x$, (ii) $BB_y < R_y$, or (iii) ($BB_x < 2R_x$) AND ($BB_y < 2R_y$), without the need to perform calculations as described above (which may be referred to as "coverage tests") involving the line equations of the edges of the primitive. If all of these conditions are not satisfied then a definitive determination regarding full coverage remains to be made. In that case the method can continue to perform the coverage tests for the primitive to make that determination. The number of coverage tests can be reduced by using the bounding boxes as described above, which can result in a reduction in processing power and latency in the system. It is noted that it is computationally very simple to determine a bounding box (e.g. an axis aligned bounding box) for a primitive, and to compare the size of the bounding box to the size of a region in order to determine whether the three conditions mentioned above are satisfied.

In step S712 the geometry processing logic determines whether there are any more identified regions for the primitive. If there are then the method passes back to step S704 in which another identified region is selected for the region and the method steps S706 to S710 are performed for the newly selected region. If it is determined in step S712 that there are no more identified regions for the primitive then the method passes to step S714 in which it is determined whether there are any more primitives of the current render to process in the geometry processing phase. If there is another primitive in the current render that has not yet been processed then the method passes back to step S702 and the method is performed for the new primitive. However, if there is not another primitive in the current render that has not yet been processed then the geometry processing phase is complete for the current render.

Then the rendering phase can begin. As described above, the rendering phase can be performed by rendering logic on a region-by-region basis, e.g. a tile-by-tile basis. In this way, individual regions can be rendered independently. The control list for a region identifies which primitives are relevant for rendering a particular region, e.g. which primitives are present within the particular region. In step S716 the stored data for the primitives which are present within a region can be retrieved. This stored data can include the data describing the primitives (such as position and attribute data), and it can also include the data that was stored in the geometry processing phase to indicate whether or not the primitive totally covers the region.

Part of the rendering phase for a region is to perform sampling to determine which sample points within the region a primitive is present at and to determine primitive fragments at the sample points which a primitive is present at. As mentioned above, this process may be referred to as "scan conversion" or "rasterization". If it is known that a primitive totally covers the region then it is known that the primitive is present at every sample point within the region without needing to perform any further processing (e.g. the aforementioned sampling) in order to determine this. Therefore, the rendering phase comprises selectively processing the primitives which are present in the region based on the retrieved data to determine which sample points within the region are covered by the primitives, wherein if the retrieved data indicates total coverage of the region for a particular primitive then the processing to determine which sample points within the region are covered by the particular primitive is skipped. In particular, in step S718 the rendering logic determines whether the retrieved data for a primitive indicates that the primitive totally covers the region, and if it does then the method passes to step S722 for that primitive, i.e. by skipping or bypassing step S720. However, it is determined in step S718 that the primitive does not totally cover the region then the method will pass from step S718 to step S720 in which sampling is performed in order to determine which sample points within the region are covered by the primitive.

For example, when the rendering logic is rendering the region 602, both of the primitives 604 and 606 will be indicated as being present within the region 602. Data will have been stored during the geometry processing phase for the primitive 606 to indicate that it totally covers the region 602, but the primitive 604 does not totally cover the region. Therefore, during the rendering phase, when processing the primitive 604 the sampling is performed in step S720 in order to determine which of the sample points of the region 602 the primitive 604 is present at. However, during the rendering phase, when processing the primitive 606, the sampling (i.e. step S720) can be skipped, and the rendering logic determines that the primitive is present at all of the sample points within the region 602 without needing to perform sampling in respect of the primitive.

In step S722 the primitive fragments representing the primitives at the sample points within the region are processed in order to determine rendered values at the sample points. In other words, rendered values are determined at the sample points within the region based on the primitives which cover the respective sample points. This rendering uses the primitive data for the each of the primitives which are present in the region (e.g. the primitive data as interpolated at each of the sample points at which the primitive is present). Step S722 involves processing primitive fragments to determine rendered values by performing processes such as hidden surface removal, texturing and/or shading. The fragment processing operations performed in step S722 are known in the art and can be performed in different way in different examples.

The rendering phase is performed for each of the regions within the rendering space, such that rendered values can be determined for the whole render. The rendered values may be provided to a memory, e.g. for storage in a frame buffer. The rendered values may represent an image of a scene as viewed from a viewpoint. In some examples, the rendered values may represent a texture to be applied to a surface in a scene. The rendered values can be used in any suitable manner, e.g. if the rendered values represent an image of a scene then it may be displayed on a display or stored in memory or transmitted to another device, etc.

Figure 8:
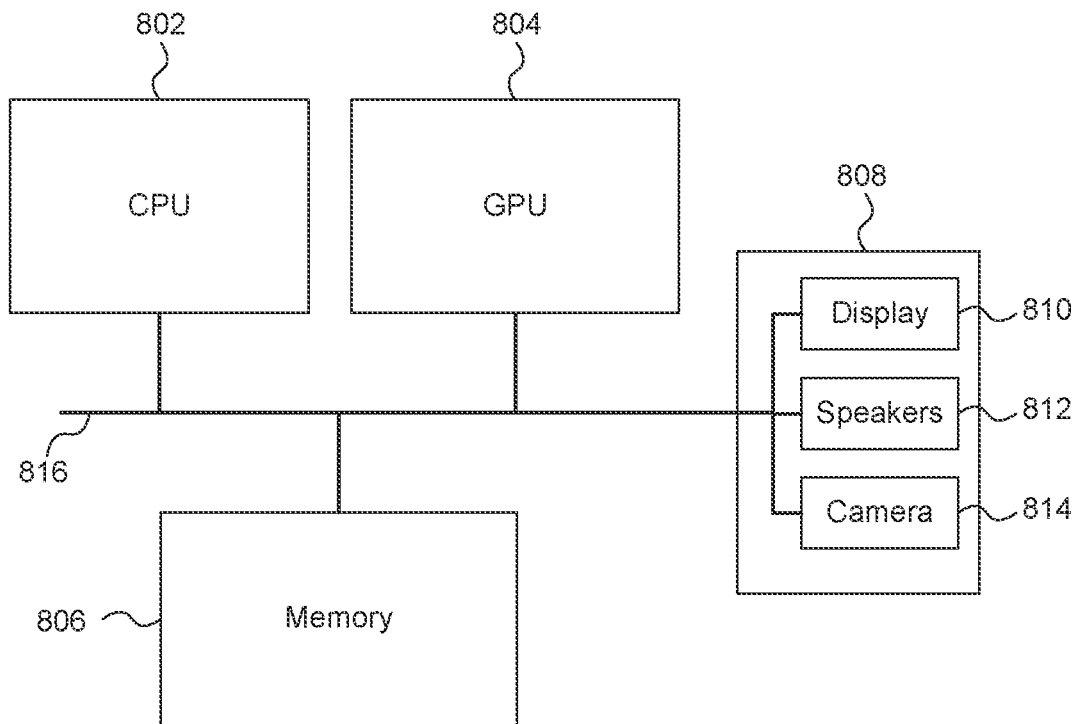
FIG. 8 shows a computer system in which a graphics processing system is implemented.

FIG. 8 shows a computer system in which the graphics processing systems described herein may be implemented. The computer system comprises a CPU 802, a GPU 804, a memory 806 and other devices 808, such as a display 810, speakers 812 and a camera 814. The components of the computer system can communicate with each other via a communications bus 816. At least part of the memory 806 may be used as the memory 102 shown in FIG. 1.

The graphics processing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a graphics processing system need not be physically generated by the graphics processing system at any point and may merely represent logical values which conveniently describe the processing performed by the graphics processing system between its input and output.

The graphics processing systems described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 9.

Figure 9:
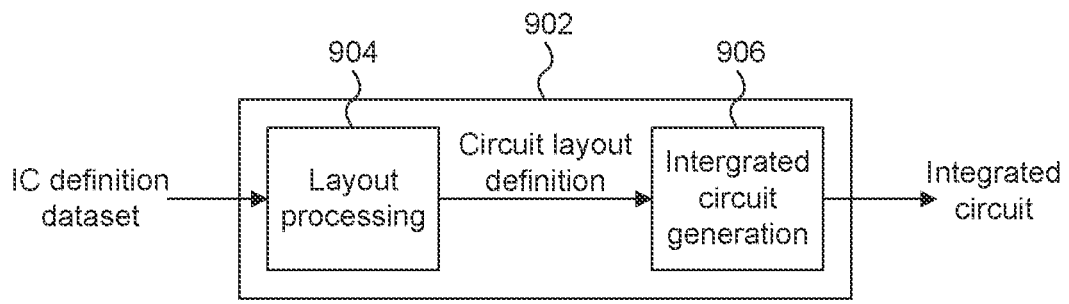
FIG. 9 shows an integrated circuit manufacturing system for generating an integrated circuit embodying a graphics processing system.

FIG. 9 shows an example of an integrated circuit (IC) manufacturing system 902 which is configured to manufacture a graphics processing system as described in any of the examples herein. In particular, the IC manufacturing system 902 comprises a layout processing system 904 and an integrated circuit generation system 906. The IC manufacturing system 902 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 902 to manufacture an integrated circuit embodying a graphics processing system as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of rendering items of geometry in a graphics processing system, wherein the graphics processing system is configured to use a rendering space which is sub-divided into a plurality of first regions, each of the first regions being sub-divided into a plurality of second regions within the rendering space, wherein the method comprises:
processing a plurality of items of geometry including at least one item of geometry which is present within two or more of the first regions, wherein each of the plurality of items of geometry is processed by:
identifying which of the first regions the item of geometry is present within; and
for each identified first region:
determining an indication of the spatial coverage, within the identified first region, of the item of geometry; and
using the determined indication of the spatial coverage within the identified first region to determine whether to add the item of geometry to a first control list for the identified first region or to add the item of geometry to one or more second control lists for a respective one or more of the second regions within the identified first region; and
rendering items of geometry within a second region using:
(i) the first control list for the first region of which the second region is a part, and (ii) the second control list for the second region.

2. The method of claim 1, wherein said using the determined indication of the spatial coverage within the identified first region comprises:
comparing the determined indication of the spatial coverage with a threshold; and
using a result of the comparison to determine whether to add the item of geometry to the first control list or to the one or more second control lists.

3. The method of claim 1, wherein said determining an indication of the spatial coverage, within the identified first region, of the item of geometry comprises determining a sub-polygon representing part of the item of geometry within the identified first region.

4. The method of claim 3, further comprising:
determining a bounding box of the sub-polygon; and
comparing a size of the bounding box of the sub-polygon with a threshold size, wherein if the size of the bounding box is below the threshold size then the item of geometry is added to the one or more second control lists.

5. The method of claim 4, wherein if the size of the bounding box of the sub-polygon is above the threshold size then the method further comprises comparing the area of the sub-polygon with a threshold area, wherein if the area of the sub-polygon is below the threshold area then the item of geometry is added to the one or more second control lists, and wherein if the area of the sub-polygon is above the threshold area then the item of geometry is added to the first control list.

6. The method of claim 5, wherein the area of the sub-polygon is determined using co-ordinates of the vertices of the sub-polygon which are rounded to quantised positions, wherein the quantised positions are aligned with boundaries between the second regions or with boundaries between blocks of second regions.

7. The method of claim 3, wherein said determining an indication of the spatial coverage, within the identified first region, of the item of geometry further comprises:
determining the area of the sub-polygon; and
comparing the determined area of the sub-polygon with a threshold area, wherein if the area of the sub-polygon is below the threshold area then the item of geometry is added to the one or more second control lists, and wherein if the area of the sub-polygon is above the threshold area then the item of geometry is added to the first control list.

8. The method of claim 1, wherein said determining an indication of the spatial coverage, within the identified first region, of the item of geometry comprises determining the number of second regions within the first region in which the item of geometry is present.

9. The method of claim 8, wherein:
if the item of geometry is present within more than a threshold number of the second regions within the first region then the item of geometry is included in the first control list for the first region, and
if the item of geometry is present within less than the threshold number of the second regions within the first region then the item of geometry is included in the one or more second control lists for the respective one or more second regions within the first region in which the item of geometry is present.

10. The method of claim 8, wherein:
if the item of geometry is present within all of the second regions within the first region then the item of geometry is included in the first control list for the first region, and
if the item of geometry is present within fewer than all of the second regions within the first region then the item of geometry is included in the one or more second control lists for the respective one or more second regions within the first region in which the item of geometry is present.

11. The method of claim 1, wherein said using the determined indication of the spatial coverage within the identified first region comprises:
if the determined indication of the spatial coverage indicates that the item of geometry fully covers the identified first region, adding the item of geometry to the first control list, and
if the determined indication of the spatial coverage indicates that the item of geometry does not fully cover the identified first region, adding the item of geometry to the one or more second control lists for the respective one or more second regions within the identified first region in which the item of geometry is present,
wherein said rendering items of geometry within a second region comprises selectively processing items of geometry to determine which sample points within the second region are covered by the items of geometry, wherein said processing is skipped for items of geometry which are in the first control list since it is known that items of geometry in the first control list cover all of the sample points within the second region.

12. The method of claim 1, wherein the items of geometry are stored in data blocks in accordance with a submission order of the items of geometry, wherein each data block is associated with a block ID, and wherein entries in the control lists include a block ID with a geometry indication to identify a data block and to indicate one or more items of geometry from the identified data block.

13. The method of claim 12, wherein said rendering items of geometry within a second region comprises:
choosing, from the first control list for the first region of which the second region is a part and the second control list for the second region, the lowest block ID which has not been previously chosen; and
fetching one or more items of geometry from the data block with the chosen block ID in accordance with the geometry indication for said data block with the chosen block ID.

14. The method of claim 13, wherein if the lowest block ID which has not been previously chosen is in both the first control list for the first region of which the second region is a part and the second control list for the second region, then the method comprises forming a merged geometry indication which identifies items of geometry from the data block with said lowest block ID based on the geometry indications of said first and second control lists.

15. The method of claim 1, further comprising, for each identified first region, if an item of geometry is to be added to the first control list for the identified first region:
determining a sub-region mask for the item of geometry to indicate which of a plurality of sub-regions within the first region the item of geometry is present within; and including the sub-region mask for the item of geometry in the first control list, wherein:
the sub-regions are second regions within the first region, or
the sub-regions are groups of second regions within the first region.

16. The method of claim 1, wherein adding an item of geometry to a control list comprises adding an indication of the item of geometry to the control list.

17. The method of claim 1, wherein the rendering space is sub-divided into a plurality of third regions, wherein each of the third regions corresponds to a group of first regions within the rendering space, wherein said processing an item of geometry comprises:
identifying which of the third regions the item of geometry is present within; and
for each identified third region:
determining an indication of the spatial coverage, within the identified third region, of the item of geometry; and
using the determined indication of the spatial coverage within the identified third region to determine whether to add the item of geometry to a third control list for the identified third region or to proceed with said processing of the item of geometry; and wherein the items of geometry within a second region are rendered further using: (iii) the third control list for the third region of which the first region, of which the second region is a part, is a part.

18. The method of claim 1, wherein the items of geometry are within a 3D scene to be rendered from a viewpoint, and wherein said rendering items of geometry generates image values representing an image of the scene as viewed from the viewpoint.

19. A graphics processing system configured to render items of geometry using a rendering space which is sub-divided into a plurality of first regions, each of the first regions being sub-divided into a plurality of second regions within the rendering space, wherein the graphics processing system comprises:
geometry processing logic configured to process a plurality of items of geometry including at least one item of geometry which is present within two or more of the first regions, wherein the geometry processing logic is configured to process each of the plurality of items of geometry by:
identifying which of the first regions the item of geometry is present within; and
for each identified first region:
determining an indication of the spatial coverage, within the identified first region, of the item of geometry; and
using the determined indication of the spatial coverage within the identified first region to determine whether to add the item of geometry to a first control list for the identified first region or to add the item of geometry to one or more second control lists for a respective one or more of the second regions within the identified first region; and rendering logic configured to render items of geometry within a second region using: (i) the first control list for the first region of which the second region is a part, and (ii) the second control list for the second region.

20. A non-transitory computer readable storage medium having stored thereon a computer readable dataset description of a graphics processing system that, when processed in an integrated circuit manufacturing system, causes the integrated circuit manufacturing system to manufacture an integrated circuit embodying the graphics processing system which is configured to render items of geometry using a rendering space which is sub-divided into a plurality of first regions, each of the first regions being sub-divided into a plurality of second regions within the rendering space, wherein the graphics processing system comprises:

geometry processing logic configured to process a plurality of items of geometry including at least one item of geometry which is present within two or more of the first regions, wherein the geometry processing logic is configured to process each of the plurality of items of geometry by:

identifying which of the first regions the item of geometry is present within; and for each identified first region:

determining an indication of the spatial coverage, within the identified first region, of the item of geometry; and using the determined indication of the spatial coverage within the identified first region to determine whether to add the item of geometry to a first control list for the identified first region or to add the item of geometry to one or more second control lists for a respective one or more of the second regions within the identified first region; and rendering logic configured to render items of geometry within a second region using: (i) the first control list for the first region of which the second region is a part, and (ii) the second control list for the second region.

* * * * *